(12) United States Patent
Petzold et al.

(10) Patent No.: US 8,626,438 B2
(45) Date of Patent: Jan. 7, 2014

(54) EFFICIENT LOCATION REFERENCING METHOD

(75) Inventors: Lars Petzold, Berlin (DE); Ralf-Peter Schaefer, Berlin (DE); Sven Baselau, Berlin (DE)

(73) Assignee: TomTom International B.V., Amsterdam (NL)

( * ) Notice: Subject to any disclaimer, the term of this patent is extended or adjusted under 35 U.S.C. 154(b) by 438 days.

(21) Appl. No.: 12/736,713

(22) PCT Filed: Jun. 29, 2009

(86) PCT No.: PCT/EP2009/058131
§ 371 (c)(1),
(2), (4) Date: Dec. 28, 2010

(87) PCT Pub. No.: WO2010/000707
PCT Pub. Date: Jan. 7, 2010

(65) Prior Publication Data
US 2011/0118971 A1     May 19, 2011

Related U.S. Application Data

(60) Provisional application No. 61/129,491, filed on Jun. 30, 2008, provisional application No. 61/193,027, filed on Oct. 22, 2008.

(51) Int. Cl.
*G01C 21/00* (2006.01)
(52) U.S. Cl.
USPC .......................................... 701/411; 701/408
(58) Field of Classification Search
USPC .................... 701/117, 400, 408–411
See application file for complete search history.

(56) References Cited

U.S. PATENT DOCUMENTS

| 8,285,485 B2 * | 10/2012 | Montealegre et al. ........ 701/532 |
| 2003/0009277 A1 * | 1/2003 | Fan et al. ....................... 701/117 |

(Continued)

FOREIGN PATENT DOCUMENTS

| EP | 1 637 841 | 3/2006 |
| GB | 2 443 472 | 5/2008 |

OTHER PUBLICATIONS

International Preliminary Report on Patentability dated Jan. 5, 2011.

*Primary Examiner* — Hussein A. Elchanti

(57) ABSTRACT

A efficient method of encoding a continuous path within a road network in which the path to be encoded is expressible as a path list of lines and/or segments existing in a digital map and consecutively ordered. The method comprises the steps of: (i) storing a start position in a route search list; (ii) determining a path from a start node of the start position and including said start position to an end node of the last line or segment in the path list within said digital map, said path being determined according to a shortest path algorithm; (iii) comparing the shortest path so determined to the path list, and identifying at least one deviation line or segment being part of the path list and having a start node representative of an intersection in said digital map but not being the line or segment first appearing in said path list, and if such deviation line or segment does not terminate at the end node of the last line or segment appearing in the path list, repeating step (i) using said deviation line or segment; and (iv) storing the last line or segment in the path list in said route search list if not already stored.

12 Claims, 14 Drawing Sheets

(56) References Cited

U.S. PATENT DOCUMENTS

| | | |
|---|---|---|
| 2003/0223373 A1 | 12/2003 | Nakamura et al. |
| 2003/0229441 A1 | 12/2003 | Pechatnikov et al. |
| 2004/0039520 A1 | 2/2004 | Khavakh et al. |
| 2004/0073362 A1* | 4/2004 | Fabian et al. ................ 701/210 |
| 2005/0033511 A1 | 2/2005 | Pechatnikov et al. |
| 2006/0122846 A1 | 6/2006 | Burr et al. |
| 2007/0038362 A1* | 2/2007 | Gueziec ........................ 701/117 |
| 2008/0162033 A1* | 7/2008 | Wagner et al. ................ 701/201 |
| 2011/0118972 A1* | 5/2011 | Boschker ...................... 701/200 |

* cited by examiner

Connection of LRPs

Logical format: Bearing point

Logical format: Bearing

Logical format: Distance to next point

Logical format: Positive and negative offset

Relationship: Attributes - LRP

Avoid nodes (1)

to avoid

Avoid nodes (2)

Physical format: Bearing sectors

EFFICIENT LOCATION REFERENCING METHOD

This is a National Phase of PCT Patent Application No. PCT/EP2009/058131 filed on Jun. 29, 2009, which claims priority under 35 U.S.C. §365(c) and 119(e) to U.S. Provisional Application No. 61/129,491, filed on Jun. 30, 2008 and U.S. Provisional Application No. 61/193,027, filed on Oct. 22, 2008, the contents of each of which are hereby incorporated herein by reference in their entirety.

FIELD OF THE INVENTION

The present invention is concerned with an efficient map agnostic on-the-fly location referencing method. More particularly, the method is embodied in a location encoding method which, although involving as a prerequisite a digital map such as those produced and sold by companies such as Tele Atlas B.V. and Navteq Inc., is ultimately map-agnostic in that the particular version or type of digital map used is not fundamentally important to the resulting encoded description of the physical location.

In the interests of clarity, the term "location" as used hereinafter is to considered as encompassing a variety of different physical, real-world features such as a point location on the surface of the earth, a continuous path or route, or a contiguous chain of such, of navigable thoroughfares existing on earth, or an area or region on earth capable of being defined by two (in the case of a rectangular, square or circular area), or more parameters. More succinctly, a location is a simple or compound geographical object. However, this invention is most applicable to an efficient, machine-readable representation of a path through a network of roads or other navigable thoroughfares represented in a digital map.

BACKGROUND TO THE INVENTION

Geocoding is a known technique whereby a human referencing system for physical locations, such as a street address, country and/or postcode is converted into associated geographic coordinates, e.g. latitude and longitude. Various different geocoding systems currently exist and rely, at least to some extent, on a geographic information system (GIS) in which the street network is already mapped within the geographic coordinate space. Inverse geocoding is the reverse process.

Any modern digital map (or mathematical graph, as they are sometimes known) can be considered as a GIS, and in a most simple form is effectively a database consisting of a plurality of tables defining firstly nodes (which can be considered as points or zero-dimensional objects) most commonly representative of road intersections, and secondly lines between those nodes representing the roads between those intersections. In more detailed digital maps, lines may be divided into segments defined by a start node and end node, which may be the same in the case of a segment of zero length or a looped segment (in which case the segment has a non-zero length), but are more commonly separate. Nodes may be considered real or "valid" for the purposes of this application when they represent a road intersection at which a minimum of 3 lines or segments intersect, whereas "artificial" or "avoidable" nodes are those which are provided as anchors for segments not being defined at one or both ends by a real node. These artificial nodes are useful in digital maps to provide, among other things, shape information for a particular stretch of road.

In this manner, nodes, lines and segments can be used as a means of completely describing a road network, and each element in the database is further defined by various attributes which are again represented by data in the tables of the database, e.g. each node will typically have latitude and longitude attributes to define its real-world position. The complete "graph" of the road network is described by millions of nodes and segments to cover an area of spanning one or more countries, or part thereof.

Although practically all modern digital maps involve a structured definition of nodes and segments, the actual manner in which this is effected between digital map providers varies enormously. For instance, each map vendor (and possibly each map version) may use unique IDs for each map element, whether node or segment. Therefore, even simple geocoding and inverse geocoding is possible only with some knowledge of the underlying structure of the database in which the requisite digital map is embodied. More simply, a query designed to extract a street address from one digital map database based on latitude and longitude will not necessarily work on another—it may need re-casting as appropriate for the particular digital map database in question. This can also be true for different versions of a digital map provided by the same vendor.

One particular attribute often included in digital map databases is a Traffic Message Channel (TMC) location table reference. TMC is a technology for delivering traffic and travel information to vehicle users, and more particularly to navigation systems (either portable or integrated) present within those vehicles and which include some form of digital map. A TMC message consists of an event code (which need not be traffic-specific, although these are most common) and a location code, often consisting of an ordered list of location references by means of which the location of the traffic event can be determined in the digital map and thus represented graphically on the screen of the navigation system. A number of pre-defined nodes in the digital map are assigned a TMC location reference which is determined with reference to a limited location table. The location table consists of $2^{16}$ (65536) location references corresponding to a similar number of physical or real world locations, usually road intersections, also identifiable in the digital map.

Although TMC messages are very efficient in that they can be as short as 37 bits in length and therefore do not impinge significantly on available bandwidth for broadcast data, only a fixed number of location references are available, and therefore typically only motorways and major highways (or intersections thereon) in each country offering TMC can be referenced. There are various other disadvantages of TMC location references. For instance, TMC location tables are often maintained through a public authority or National Government, prone to change between update cycles, which are traditionally quite long, non-existent, or available only commercially, in some markets.

As it is becoming possible to identify traffic build up on secondary and urban roads using GSM and GPS probe data (e.g. vehicles users increasingly possess either a mobile phone or a connected satellite navigation devices useful as probes), a more expansive referencing system is required.

One attempt to overcome some of the drawbacks of TMC location references or map-specific references is the Dynamic Location Referencing project, also known as AGORA-C (in the process of standardization under no. ISO 17572-1,2, and 3). Although a complete description of the AGORA-C location referencing approach is beyond the scope of this application, the fundamentals of the approach are that a location reference can be completely specified by a set of location points, specified by coordinate pairs of latitude and longitude and ordered in a list, each point complying with various rules but most importantly being consecutive in terms of the location being referenced and the previous point in the list, i.e. successive points form a next-point-relationship. As with other location referencing systems, each point is provided with a number of attributes which assist in better defining that point, but specific to the AGORA-C method is the identification of each point as one of a location point, an intersection point, a routing point, or some combination of these three. Each point along the location at which the road section signature changes is represented by an intersection point, so locations being paths over a road network and which pass through intersections without any road section signature change need not be referenced by an intersection point. For example, if a location includes a section of motorway which includes junctions that are not relevant as far as the location is concerned, then there is no need to include intersection points for such junctions.

One of the earlier steps in the AGORA-C encoding method is the determination of all intervening intersection points between a first and a last intersection point along the location at which a change of road section signature occurs. All these points are added to a table of points ultimately forming part of the AGORA-C location reference. Within this table, at least two routing points will also have been identified, again according to certain rules. Routing points are points used to reconstruct the location (in a decoding operation) by route calculation and are provided only where road segments having a routing point bearing attribute are longer than a certain length. During the encoding process according to the AGORA-C standard, a determination is made as to whether intermediate routing points are required to calculate a route from the first identified routing point to the last identified routing point. This determination is made using a weighted shortest path algorithm—if it is determined that additional routing points are required, then these are also added to the pre-existing table of intersection points, but only in instances where such points do not coincide with the previously identified intersection points. In this latter case, a simple attribute change is required to ensure that the pre-existing intersection point is also identified as a routing point. Although in most cases, no additional routing points may be required, it is to be noted that the effect of the weighted shortest path algorithm as applied in AGORA-C is to potentially increase the number of points required, as opposed to reducing the number of pre-existing intersection points by which the location is at first specified.

Although this referencing approach is comprehensive in that it is possible to accurately and repeatably encode and decode any location existing within a geographical information system, it is believed that that the system is excessive and possibly redundant in certain aspects, and a more efficient encoding system is possible. For instance, although the referencing method is independent of any pre-compilation work and is map-independent, the average AGORA-C message size is significantly higher than 30 bytes per location reference which may be problematical if not prohibitive in the modern climate of highly congested transmission frequencies and the increasingly restricted bandwidths associated therewith, particularly as regards mobile/wireless devices to which it may be desired to transmit such information.

It is therefore an object of this invention to provide an efficient and compact format for a location reference which:
  is more efficient than AGORA-C without significantly compromising on accuracy,
  is not prejudicial to available bandwidths for broadcast data,
  is capable of accounting for differences in the underlying digital map (or differences between versions thereof) used in creating the reference
  can be a complete substitute for the TMC location referencing system
  is capable of addressing the entire road network including urban and low-level roads of any country for which a digital map is available, and
  does not require periodic maintenance.

SUMMARY OF THE INVENTION

A method of encoding a continuous path within a road network, said path being completely represented within a digital map and expressible as a path list of lines and/or segments existing in said digital map and consecutively ordered, said method comprising the steps of:
(i) storing a start position in a route search list, said start position being one of:
  the line or segment first appearing in said path list or, where the start node of said first line or segment is artificial, the first line or segment appearing in said digital map having a real start node and which leads directly to said first line or segment optionally through other artificial nodes,
  a most recently identified deviation line or segment also appearing in said path list,
(ii) determining a path from the start node of the start position and including said start position to an end node of the last line or segment in the path list within said digital map using an algorithm,
(iii) comparing the shortest path so determined to the path list for identity, and in the absence of identity, identifying at least one deviation line or segment being part of the path list and having a start node representative of an intersection in said digital map but not being the line or segment first appearing in said path list, and if such deviation line or segment does not terminate at the end node of the last line or segment appearing in the path list, repeating step (i) using said deviation line or segment, and
(iv) Storing the last line or segment in the path list in said route search list if not already stored.

Preferably, the algorithm used to determine the path between start position and the end node is a shortest path algorithm, but other algorithms might also be employed, provided such are reversible in that a path so determined can be decoded using the corresponding reverse algorithm.

Preferably, the method includes performing one or more of final concatenation, conversion, transposition, and validity operations which result in a valid, ordered list of location reference points as hereinafter described, or a machine-readable representation thereof.

In a second aspect of the invention, there is provided a computer program element comprising computer program code means to make a computer execute the method as set out above. In a yet further aspect, there is provided such a computer program embodied on computer readable medium.

Preferably, in the case where the start and/or end of the continuous path desired to be referenced do not coincide with a real node in the digital map, the preliminary validity check includes extending the start and end points of the continuous path such that they do coincide with real nodes appearing in the digital map, and storing an offset to represent the distance in advance or behind said real nodes that the continuous path actually commences or terminates.

Further preferably, the encoding of a continuous path is further enhanced by storing each continuous path which is successfully encoded in a database, and for each subsequent continuous path desired to be encoded, querying said database to establish whether that subsequent continuous path, or a portion thereof, has been previously encoded. Additionally, if that subsequent continuous path forms part of a larger, previously encoded continuous path, then further efficiencies may be realised in the encoding process by use of said database. Furthermore, it may also be possible to store continuous paths in said database for which encoding failed, and for the encoding process to be halted well in advance of attempting to encode subsequent continuous paths being identical to or forming part of such continuous paths.

Other features of the invention are described hereinafter and additionally in the claims appended hereto.

In contrast to the AGORA-C method for creating location references, the present method actually seeks to reduce the requisite number of location reference points appearing in a location by means of a simple shortest path algorithm. As mentioned above, the AGORA-C approach uses a weighted shortest path to determine where additional routing points should be inserted in an already comprehensive list. Furthermore, this weighted shortest path algorithm is employed primarily to avoid short detours on lower class roads which may run parallel to more arterial highways.

The present invention realises that a simpler algorithm employed on a more universal basis as opposed to a very specific situation can result in a far a simpler, and thus quicker (in terms of encoding time) approach. The resulting location reference is far more efficient, in terms of the number of location reference points required to completely reference the continuous path. In particular, although the location reference resulting from the present invention is derived from a pre-existing complete list of segments and/or lines, it bears very little resemblance thereto as the output of the method is to provide a minimal list of points from which the continuous path so referenced can subsequently be reconstructed in a decoding operation.

For instance, it is certainly possible that a continuous path of many kilometers, represented initially by many consecutive nodes, segments or lines in the digitally mapped road network, may be represented by only two location reference points, if the shortest route between the start point and end point of that path over the road network as represented by said digital map actually coincides with the continuous path over its entire length. However, the present invention does consider an arbitrary imposition of, preferably, a 15 km limit between location reference points.

A further realisation made in the present invention is that by initially starting with a list of segments or lines, as opposed to the AGORA-C method of initially representing the continuous path by a list of location, intersection and/or routing points, useful efficiency can be achieved during the algorithmic reduction of such a list to location reference points Experiments using the encoding method of the present invention have shown that an average message size for typical available traffic feeds of around 18 bytes is consistently achievable for a wide variety of different locations or continuous paths within road networks. Compared to the 30+ bytes of an AGORA-C location reference message, this represents a significant reduction.

Such reduction can be achieved not only by virtue of the referring to a location in terms of a sum or concatenation of partial shortest paths through the network, but also as a result of reduced attribute data which is required for each location reference point forming part of the location reference. These reductions will become apparent in the following description of the physical and logical data formats employed by the invention.

A specific embodiment of the invention will now be described by way of example with reference to the accompanying drawings wherein:

DETAILED DESCRIPTION

The following description of the invention is provided in terms of segments, but it is to be understood that the method can be applied equally to lines, or to combinations of lines and segments which together are representative of a continuous path through a road network.

Figure 1:
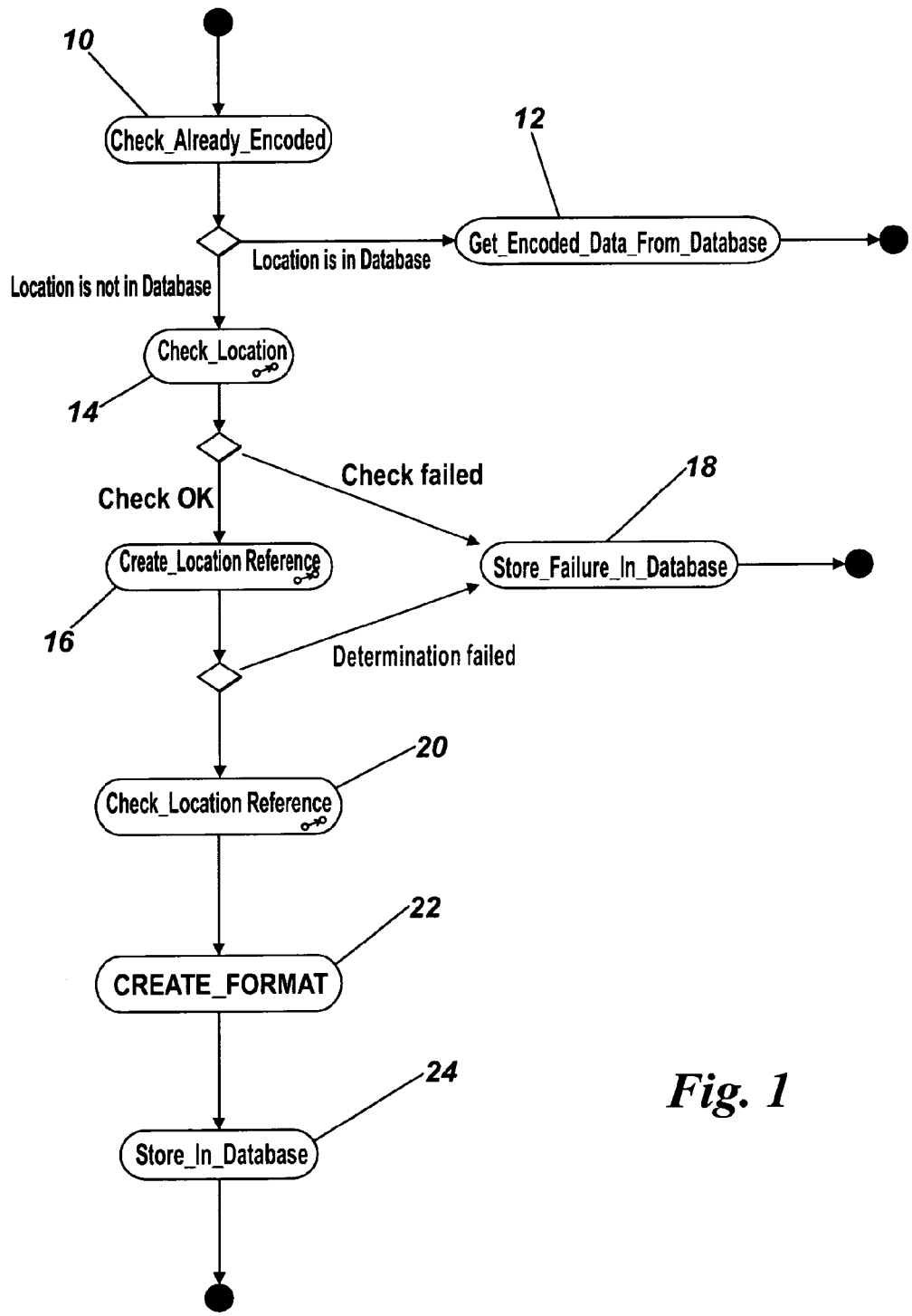
FIG. 1 shows an overview schematic flowchart of the encoding method.

Referring firstly to FIG. 1, and as previously mentioned, it is possible to store complete location references having previously been successfully encoded according to the present invention in a database, and therefore in FIG. 1 at step 10, a check is made of such database to establish whether the location desired to be encoded has already been encoded. If so, then the previously encoded location can be retrieved from the database, without any further processing.

If the location is not present in the database, then a validity check 14 is performed on the location and its constituent segments to determine whether the location meets certain criteria hereinafter described, and provided that the location is valid, the location reference is created at step 16. If either the validity check, or the creation of a location reference for that particular location fails, then such failure may also be stored in said database as indicated in step 18.

As final steps in the process, the location reference created at 16 is further checked for validity in step 20. Step 22 is illustrative in that it signifies conversion from one representation to another. Ultimately, the conversion process (which may include one or more intermediate formats) results in a wirelessly transmissible and machine readable binary representation as prescribed in a physical data format such as that hereinafter described. This format may take another form, such as XML or indeed any other mark-up or machine-readable representation useful in transferring information between an encoder and decoder, and the present invention is not to be considered limited to the specific format described. Thereafter, the complete, accurate and correct representation of the location can be stored in said database, as indicated in step 24.

Figure 2:
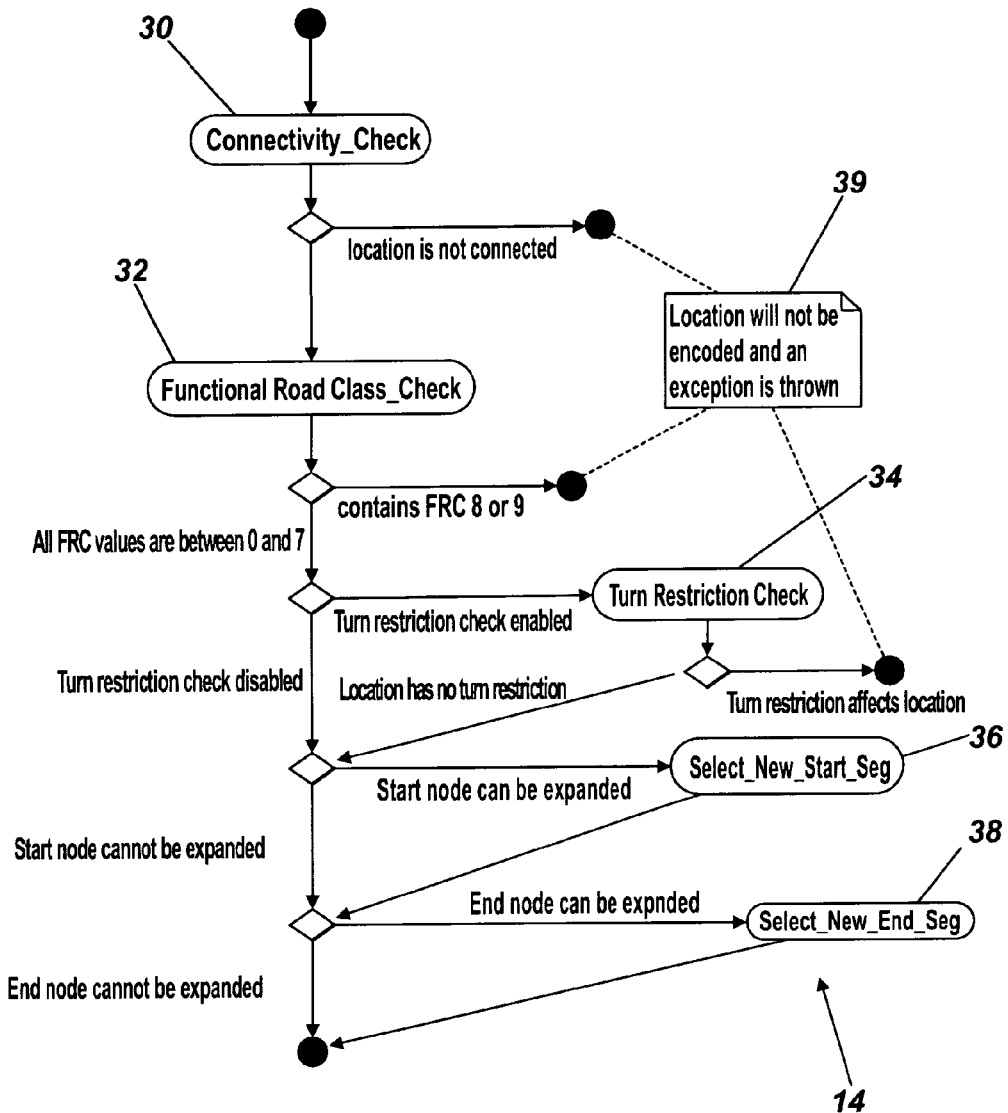
FIG. 2 shows a schematic flowchart of the validity check first performed as part of the encoding method.

Referring to FIG. 2, the "Check_Location" validity check process illustrated at 14 in FIG. 1 is further described. All locations which are not stored in the database of previously encoded locations need to be checked for validity before further processing. As a first step, at 30, a connectivity check is performed. The check of the connectivity ensures that the incoming location is not split up into two or more different stretches which are not connected. Each connected stretch needs to be handled separately and represents one location to be encoded in its own right. This check is passed if the location consists of only one connected stretch.

At step 32, a functional road class check is performed. This check ensures that all of the segments forming part of the initial location meet a minimum functional road class as defined in the underlying digital map. The functional road class (FRC) is a common attribute of lines or segments in map data and indicative of a relative importance of a particular type of road. An arbitrary decision to include only functional road classes from 0-7 has been made, as this effectively precludes any non-navigable roads, or roads of a very low category on which traffic events would be most unlikely ever to occur.

In one embodiment, the encoder can be enabled to check whether the location is affected by turn restrictions or not. If enabled, then the location will be investigated step by step, as indicated at 34, if there is a turn restriction along the way. Every turn from segment to segment needs to be valid. If not, an exception will be thrown at 39 and the location will not be encoded. It is worth mentioning here that the turn restriction check need not be enabled, and the method will continue to encode locations successfully for the vast majority of locations. However enabling a turn restriction check as described merely acts as an extra means of ensuring successful encoding.

As final steps to the validity check of the location, a determination is made as to whether the start node of the first segment in the location and the end node of the last segment in the location are real nodes, as opposed to being artificial or avoidable nodes. To explain further, segments in most instances tend to be artificial constructions and arbitrarily defined by the map vendor. Nevertheless they do provide much greater resolution compared to lines as regards describing traffic events on real-world sections of road where the traffic event begins at some arbitrary point along a particular road section. In the context of a motorway or major highway, a traffic event may occur at some point between two intersections (represented by real nodes) located a significant distance apart (e.g. 15 km or more), and therefore the exact point at which a traffic situation exists is much more likely to be close to an artificial node than it is to a real node. However, the probability of having such artificial nodes in the decoder map is very small, so these artificial nodes are to be avoided. This is done by extending the location uniquely at its start and end to real nodes appearing in the underlying digital map, and an offset distance value is provided as an attribute to such nodes so that the exact position of the traffic (or other) event, i.e. the correct start of the location to be encoded, can be correctly referenced. Therefore, the location can be described precisely by using a path which covers the location completely and offsets. Having a longer path covering the location also allows for the possibility of re-using the location reference path and merely updating the offsets, which will save bandwidth and time.

Accordingly, if the start node is not artificial then there will be no extension. Otherwise the incoming segment to the first segment having the artificial start node is chosen as the new start segment at step 36. If the start node of the new start segment is also artificial or avoidable then the procedure is repeated until a suitable start node is identified.

The second step 38 tries to extend the end of the location. This is done in much the same way as for the start segment except that the end node of the last segment is assessed, and a search made for outgoing road segments. If in either of these two steps, an artificial node cannot be extended and a real node found, then it is possible to continue with the method using the artificial node in the hope that it can be matched on the decoding side. Accordingly, the method is still valid, but the confidence level is lower.

Figure 3:
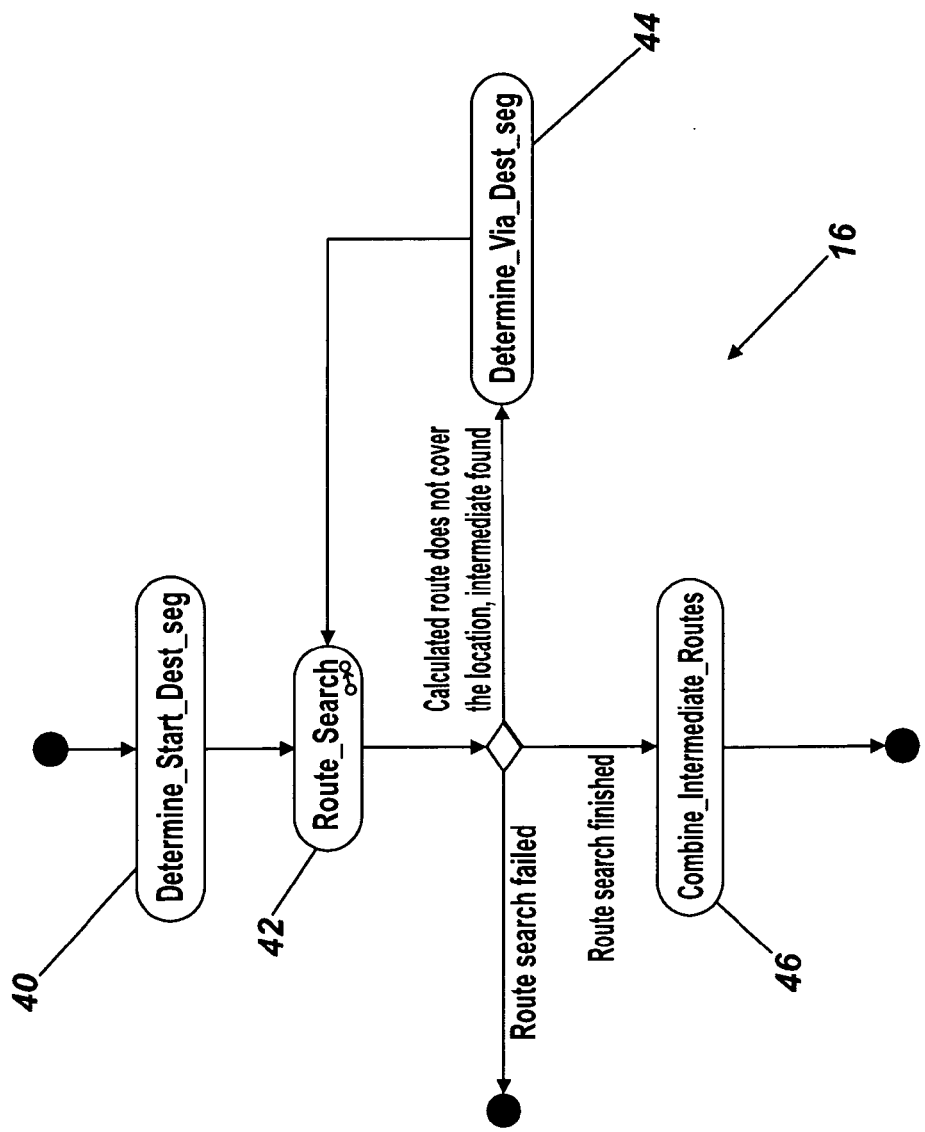
FIG. 3 shows a schematic flowchart of the iterative part of the encoding method including a shortest path route search function.

Referring to FIG. 3, a description of the Create_LocationReference step 16 in FIG. 1 is provided. After the validity processing described above, a valid sequence of segments is provided, and this is desired to be converted into a location reference as a tree of objects defined in a logical data format, as hereinafter described.

The first step 40 in the generation of a location reference according to the present invention is to identify the first segment at which the route search should commence.

Figure 4:
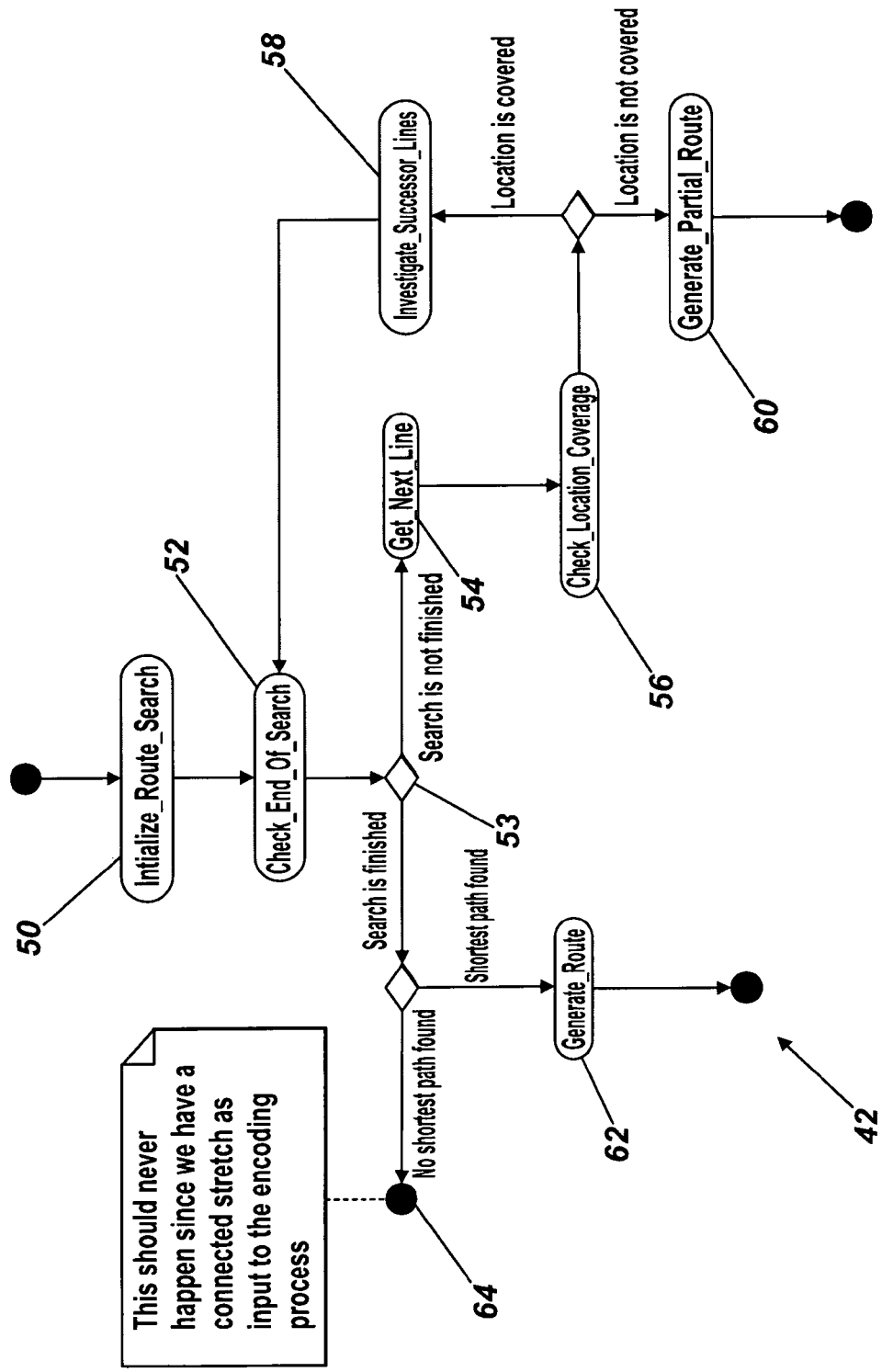
FIG. 4 shows a schematic flowchart of the shortest path route search function in greater detail.

Thereafter, a route search is performed at step 42 using either the first segment or an intermediate or deviation segment. The route search is a shortest path route calculation between the first (or intermediate) segment and last segment of the location. The specifics of route search are described in greater detail with reference to FIG. 4.

The route search calculates a shortest path between the start segment and the destination segment. This calculation is done iteratively, and after an initialization at step 50, the main loop including steps 52, 54, 56, 58 will calculate a shortest path. The shortest route path will be checked every iteration at step 56 (described in greater detail hereinafter with reference to FIG. 5) to establish whether the location is still part of the calculated shortest-path tree or not. If the location is not covered by the shortest-path tree anymore then the route calculation stops and returns a partial route (the part of the location which is covered so far) at step 60 and a segment which shall be used as intermediate location reference point to make the route search unique, and capable of being continued thereafter. This intermediate segment is identified at step 44 in FIG. 3 and returned to the route search algorithm as the new start segment from which one or more further route searches are to be conducted.

Ideally the route search will focus on the part of the location which is not extended as described above as the extended parts of the location will not have any influence on the route calculation because there is no deviation from this path possible. The extensions may be added to the location reference in a later step.

At step 50, the route search is initialized and all data structures are reset. At step 52, and decision point 53, a check is made as to whether the route search must be continued or can be stopped. The search can be stopped if the shortest-path between the start segment and destination segment is found, in which case a shortest path route can be generated as indicated at 62, there are no more segments to process which means that there exists no route between the start segment and destination segment, as indicated at 64, or If an intermediate segment is identified.

In all practical cases, a route should always exist because the path itself is valid and forms such a route but this check is compulsory for every route search algorithm. In the case that the search is not complete, at step 54, the Get_Next_Line procedure fetches the best line from what is often called an "open-list" being a list of all those lines forming part of the shortest path between two relevant nodes. As a consequence of the shortest path algorithm, the shortest path to a line is finalised with the departure of a line forming part of the location from one being present in the open-list as retrieved at step 54. Accordingly, The "Check_Location_Coverage" step 56 is outlined in greater detail with reference to FIG. 5, but briefly this step checks if this condition is fulfilled during the route calculation. Checking during the route calculation means that every fixed segment (a segment is fixed if the shortest path thereto has been finally determined) will be investigated if it also forms part of the location. If the segment currently under consideration forms part of the location desired to be referenced, then a check is made to establish that the beginning part of the location is completely included in the current shortest-path tree. This means that the calculated shortest path to the last location segment needs to be the location itself. If any deviation is encountered, the route calculation is stopped and a partial route is generated at step 60 and returned to the route search process illustrated in FIG. 3. In step 44 of this figure, an intermediate segment is identified in the underlying digital map, and route search is re-started using this intermediate segment as the start point.

There are various different possibilities for correctly identifying and referencing the intermediate segment depending on the nature of the deviation which appears in the shortest path calculation, and these are all described with reference to FIGS. 5, 6, 7, and 8.

To check coincidence of the shortest path thus far determined, the last segment found on the location during the route search is stored in a route search list (indicated at 70 in FIG. 5) so that it can easily be determined which segment should come next, as only subsequent segments contiguous with the last stored segment, or at least having coinciding end and start nodes respectively, can be considered. It is fundamental to the economy of location reference length that the shortest path route search effectively eliminates those segments from the reference which fall on the shortest path, i.e. there is no need for them to form part of the reference. Accordingly, at decision points 72, 74, checks are made that the most recent segment forming part of a shortest path route list both exists or coincides with the location being encoded, and is correctly referenced as far as the shortest path is concerned in terms of pointers which are ideally used in the shortest path list to refer to:

the next expected segment on the shortest path, and
the previous segment on said shortest path.

Provided that both these pointers reference segments which are also on the location path, then the location is considered precisely covered by the shortest path and the route search can continue.

Figure 5:
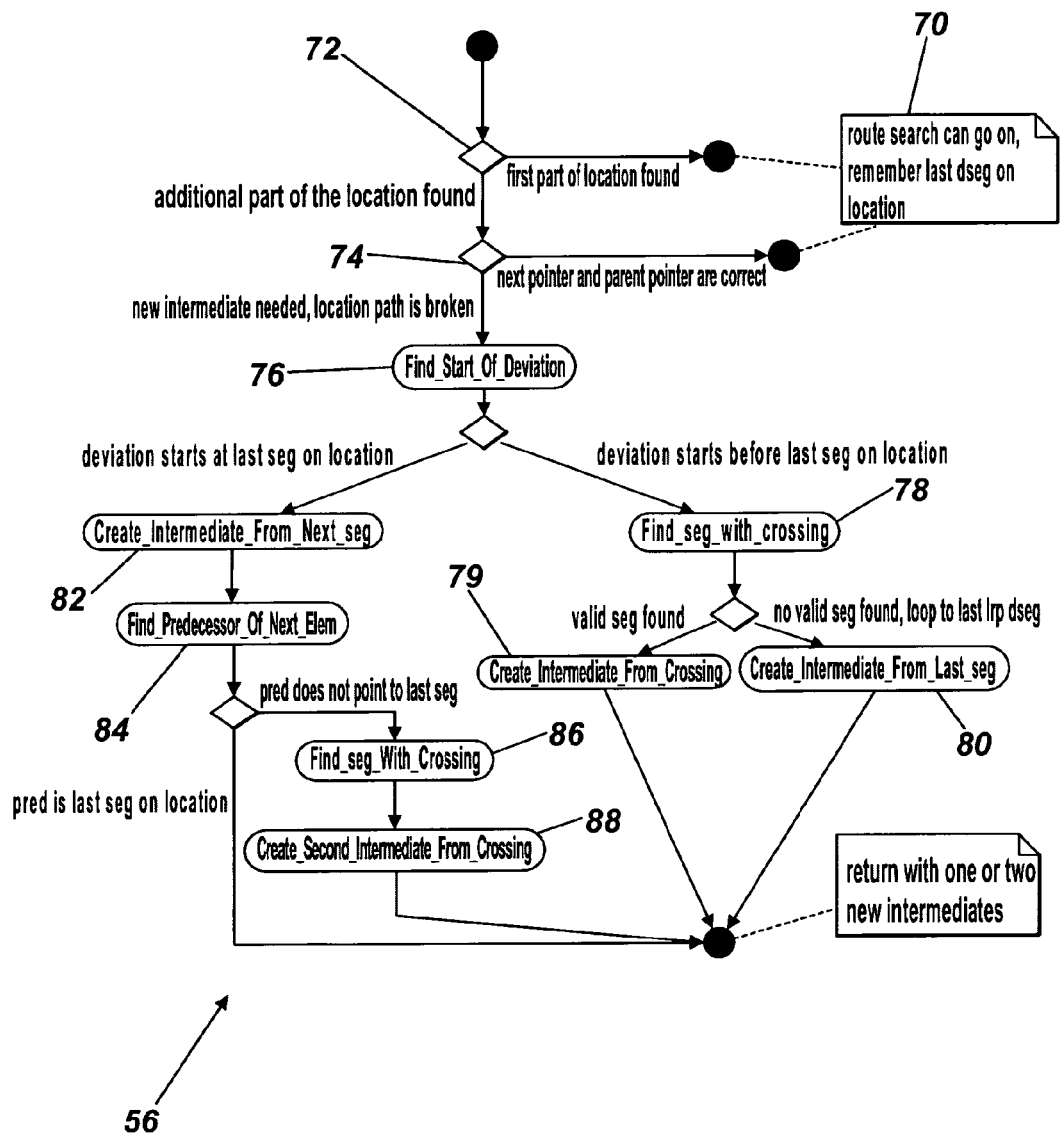
FIG. 5 shows a schematic flowchart of the procedure involved in determining that whether the location desired to be encoded is being correctly covered by the shortest path route search, FIGS. 6, 7 and 8 graphically illustrate the different possibilities occurring in checking that a location is being correctly covered by the procedure illustrated in FIG. 5, FIGS. 9, 10, 11, and 12 provide schematic representations of a digital map including nodes and segments and in particular
Figure 6:
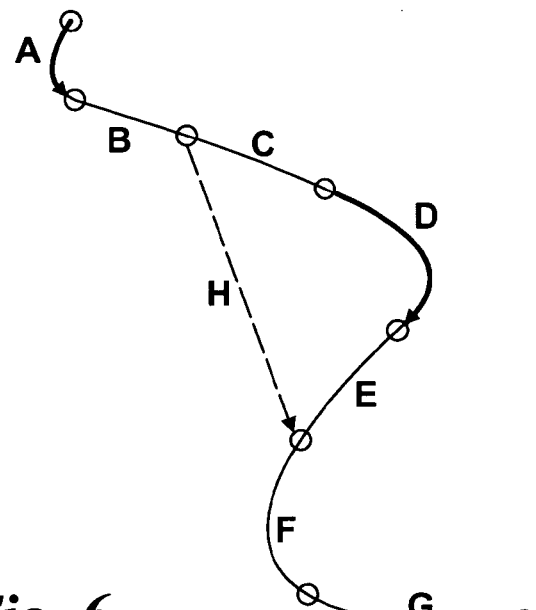
Figure 7:
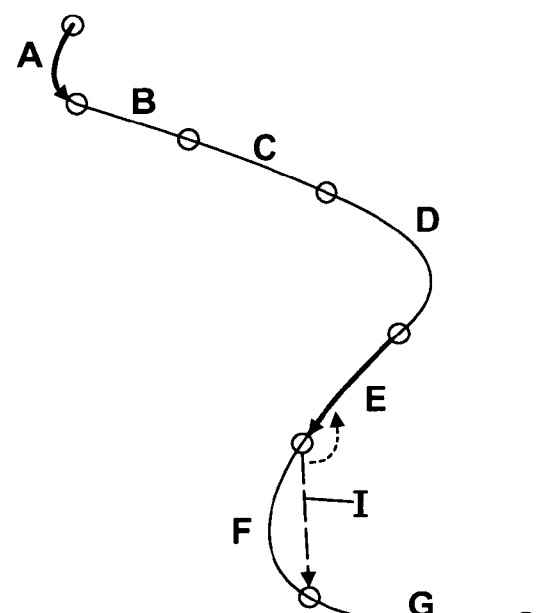
Figure 8:
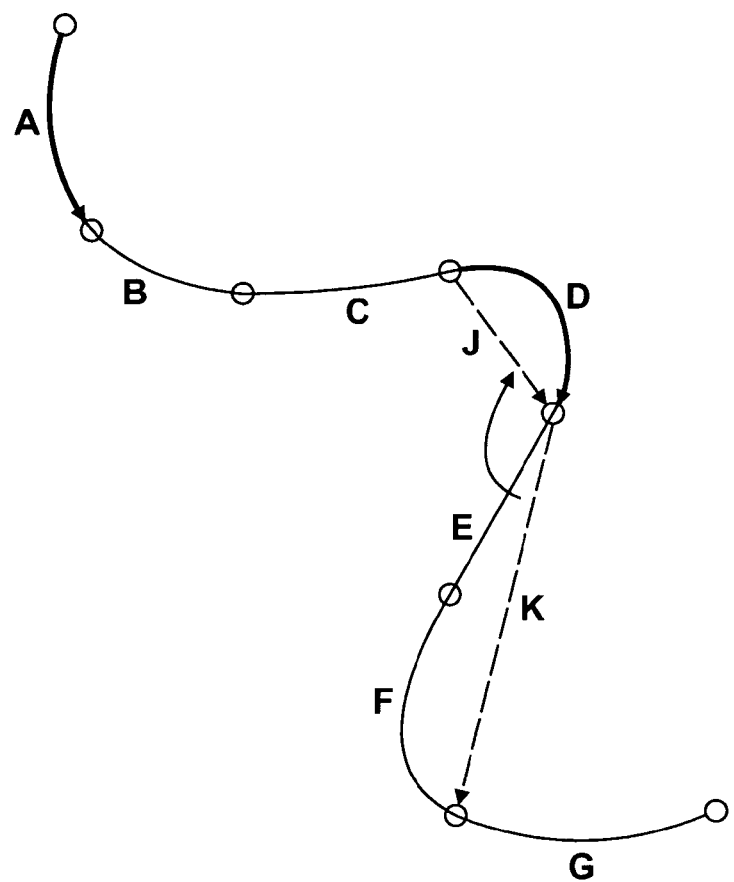

Of course however, shorter deviations will inevitably be found, and all possible deviation types are covered by the various branches of the flowchart of FIG. 5, and the simple line drawings of FIGS. 6, 7, and 8. Most simply, a deviation is found if a segment on the location path is currently being analysed but this segment is at odds with the next expected segment as far as the shortest route list is concerned. A deviation is also found if the next expected segment of the shortest route list is in conformity with the next segment in the location path list, but the predecessor pointer for this segment in the shortest path list does not point to the location. This means that the predecessor pointer needs to be equal to the last segment found on location. In both cases it is necessary to identify a proper intermediate. The following steps determine this intermediate and in a special case it is necessary to add two intermediates. The main focus on finding a proper intermediate is that we use a segment having a start node being part of an intersection.

Referring firstly to FIGS. 5 and 6, it is in all cases necessary to find the start of the deviation, indicated at 76. FIG. 6 illustrates the simplest case in which the deviation starts before the last segment stored as part of part of the shortest route list and also forming part of the original location path list. The total location path to be described is represented by segments A, B, C, D, E, F and G. The shortest path thus far determined with certainty and coinciding with the location is represented by the segments A and D, emboldened in the Figure. As the shortest path search progresses, particularly as between the start segment A and the end node of segment E, a deviation H is found which is shorter. In such a case (which will be the most common case), ideally it is desired to find the segment appearing on the location and having a start node at which the deviation starts. In this case, segment C is required to be included as the proper intermediate as this ensures that the location is followed in any shortest path algorithm conducted in a decoding process. This search effectively recourses through the location path list for segments that meet this criteria, and this is referenced at 78, 79 in FIG. 5. Although not possible in terms of the simple path shown in FIG. 6, it is possible that no such segment may be found. In this case, the segment last stored in the shortest route list can be used as the intermediate, as illustrated at 80 as a shortest path function using the last stored segment as its start will never identify any deviation originating before it.

In an alternative embodiment, the deviation originates after the end of the last segment stored in the route search list E, as emboldened in FIG. 7. In this case the shortest path from A to E is known, and only segments between A and E have been stored. The shortest path between segment A and the end node of segment F can actually be referenced by only A and I, the latter being a deviation from the location path which includes F and occurring after the end of the last stored segment E. In this case, the intermediate can be created from that segment F, as indicated at 82 in FIG. 5, provided that the predecessor pointer for segment F actually points back to a segment on the location, in this case E. This check is indicated at 84.

In the exceptional case in FIG. 8, where the predecessor pointer for a deviation occurring after the last segment stored as part of the shortest route search actually refers back to a segment not forming part of the location, as in the case of the segment K referring back to segment J, then as a first step, a first intermediate segment E is created (as in 82 previously discussed), and a second intermediate segment D is also stored as this is the last segment occurring on the location path and beginning with an intersection from which the shorter path segment J originated. These steps are indicated generally at 86, 88 in FIG. 5, and are necessary because the stored location reference must ultimately avoid both segments J and K.

Referring finally back to FIG. 3, once the processing of the entire location path list is complete, then all the partial shortest paths identified are combined at step 46. The coverage of the location may consist of several calculated partial routes if the initial route calculation determines an intermediate segment. This intermediate segment acts as additional information in the location reference in order to guide the route search for a complete coverage of the location. If the route search reaches the end of the location all calculated partial routes will be combined to form a path which covers the location completely. This step may in one embodiment also add the expansions at the start and the end of the location as calculated in steps 36, 38 illustrated in FIG. 2. The first and last location reference points will be adjusted and new offsets describing the relative position of the original location are calculated.

To provide a better understanding of the manner in which a location is encoded using the present invention, a further specific example is provided with reference to FIGS. 9, 10, 11 and 12.

Figure 9:
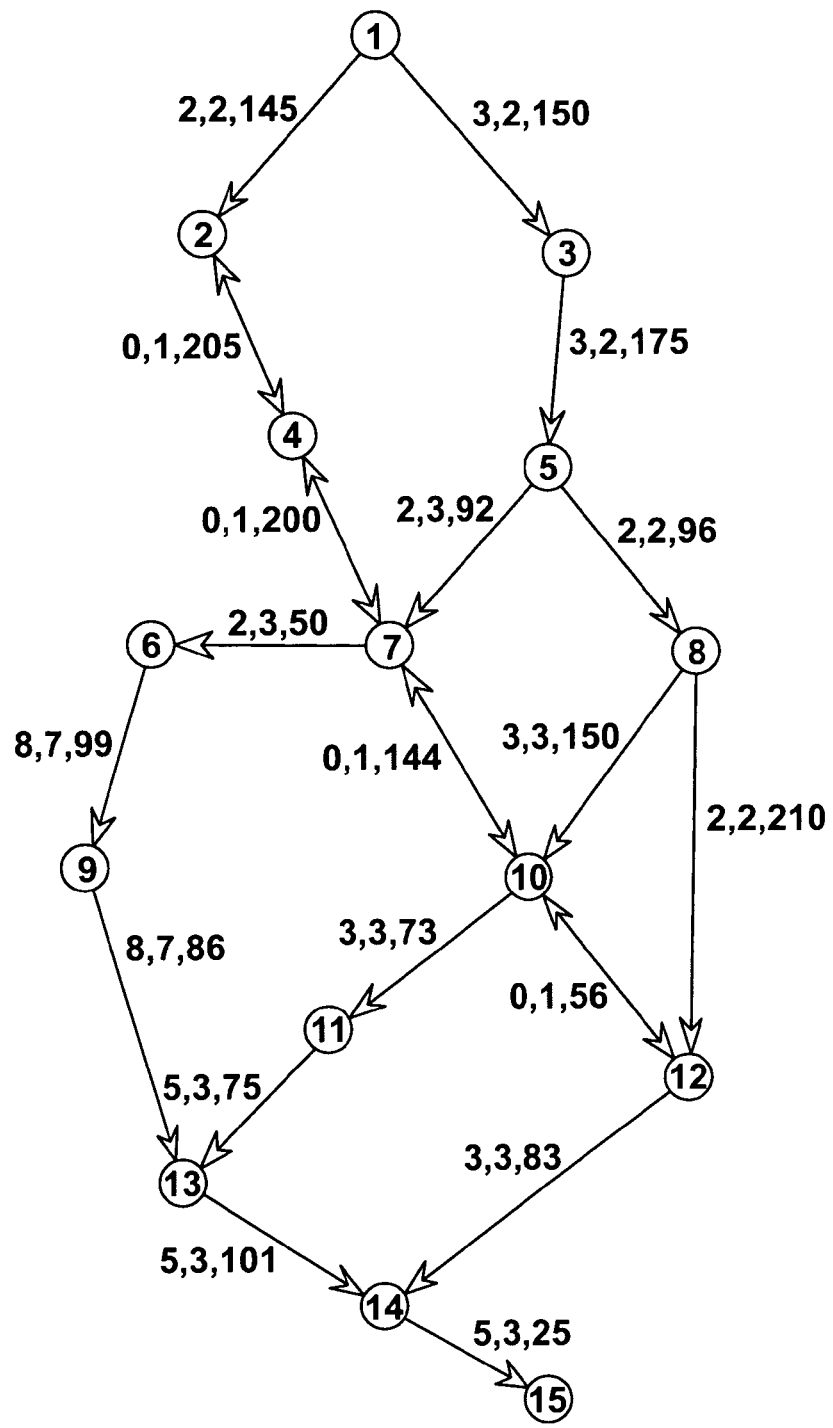
FIG. 9 illustrates an example network.

An encoder map is shown in FIG. 9 and consists of 15 nodes and 23 lines (two-way lines are counted twice). The nodes are numbered from 1 to 15. The necessary line attributes are shown beside every line using the format: <FRC>, <FOW>, <Length in meter>. FRC is an abbreviation for "Functional Road Class" and FOW is an abbreviation for "Form of Way", both of which are described in greater detail below. The arrowheads indicate the possible driving direction for each line.

Figure 10:
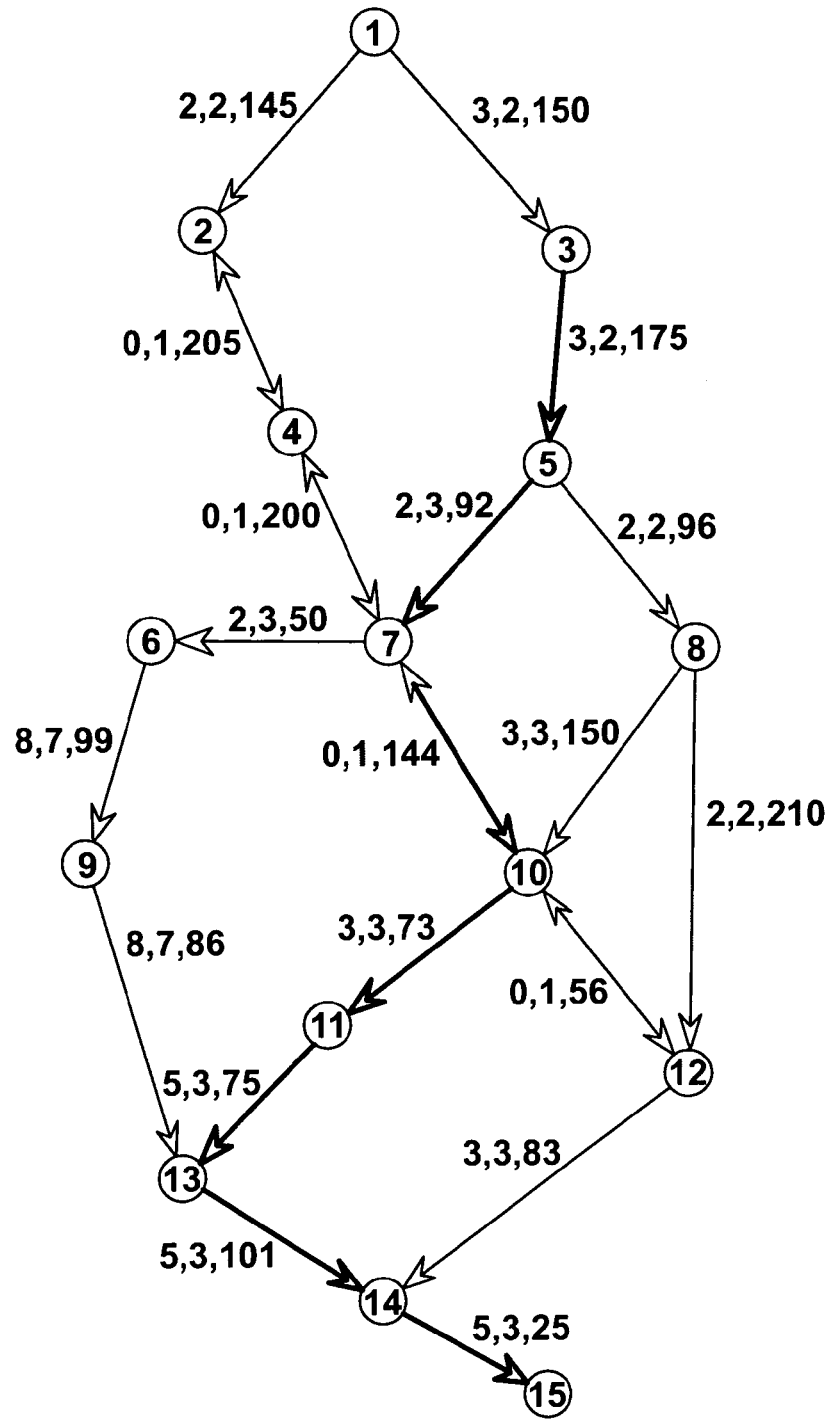
FIG. 10 illustrates a location path desired to be encoded within that network.
Figure 11:
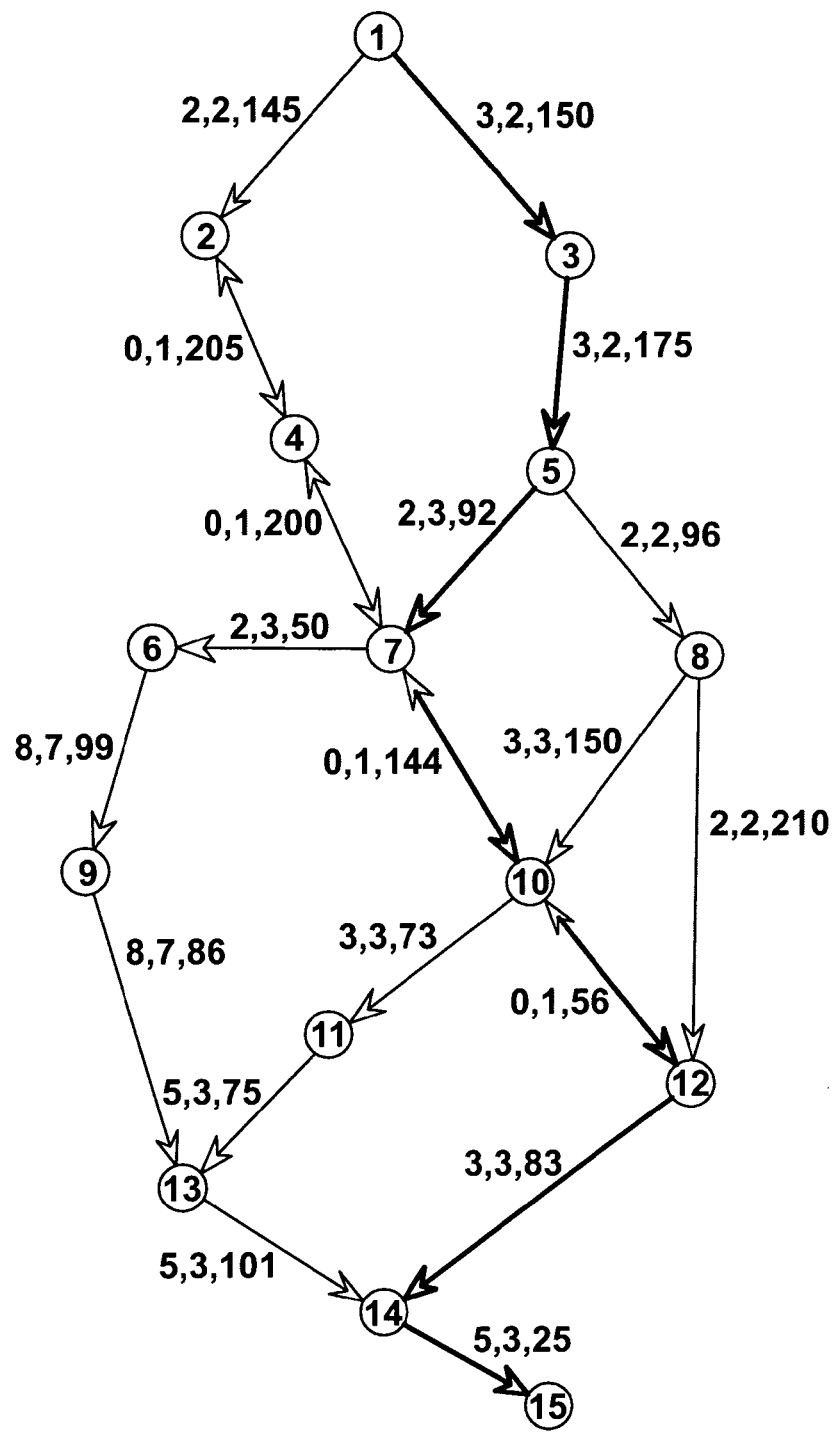
FIG. 11 illustrates the shortest path between start and end nodes of an extended path including that location.

The location to be encoded is shown in FIG. 10 using bold lines. The location starts at node (3) and continues over the nodes (5), (7), (10), (11), (13), (14) and ends at node (15). Its total length in the encoder map is 685 meters. The ordered list of lines and the map to be used during encoding serves as input for the encoder.

Encoding:

In the first step of the encoding process the location will first be checked for validity. Since the location is connected and drivable and all functional road classes along the location are between 0 and 7, this location is valid. Turn restrictions are not included in the map data and therefore the encoder can ignore this check.

The encoder second step is to check the start and end node of the location as being real nodes according to certain predetermined data format rules. The end node (15) has only one incoming line and is therefore valid. The start node (3) also has two incident lines but here it is one outgoing and one incoming line. Therefore this node is not valid and the encoder searches for a real node outside the location. The encoder will find node (1) to be a real node and it also expands the location uniquely. Node (1) is chosen as the new start node for the location reference and there will be a positive offset of 150 meters. The total length of the location reference path results in 835 meters.

The third step of encoder is to proceed to calculate a shortest-path between the start line (in this case, the line between nodes (1) and (3); however, in common usage, the shortest path may be calculated without extensions) and the end line (line between nodes (14) and (15)) of the location. The resulting shortest-path is outlined in FIG. 11 using bold lines. The shortest-path has a length of 725 meters.

The next ($4^{th}$) step of the encoding process is now to check whether the location is covered by the calculated shortest-path. It will determine that this is not the case and there is a deviation after node (10)).

According to the principles outlined above, the encoder will determine the line from node (10) to (11) as becoming a new intermediate location reference point. Node (10) is a real node since it cannot be stepped over during route search and the shortest-path to this line covers the corresponding part of the location completely. The length of the location being covered after this first shortest-path calculation is 561 meters.

The next encoding step prepares the route calculation in order to determine a shortest-path for the remaining part of the location (from node (10) over (11), (13) and (14) to (15)). The shortest-path calculation will therefore start at the line from (10) to (11) and ends at the line from (14) to (15).

The encoder returns to step 3 above and will determine a shortest path (length: 274 meters) between (10) and (15) and step 4 above will return that the location is now completely covered by the calculated shortest paths.

Figure 12:
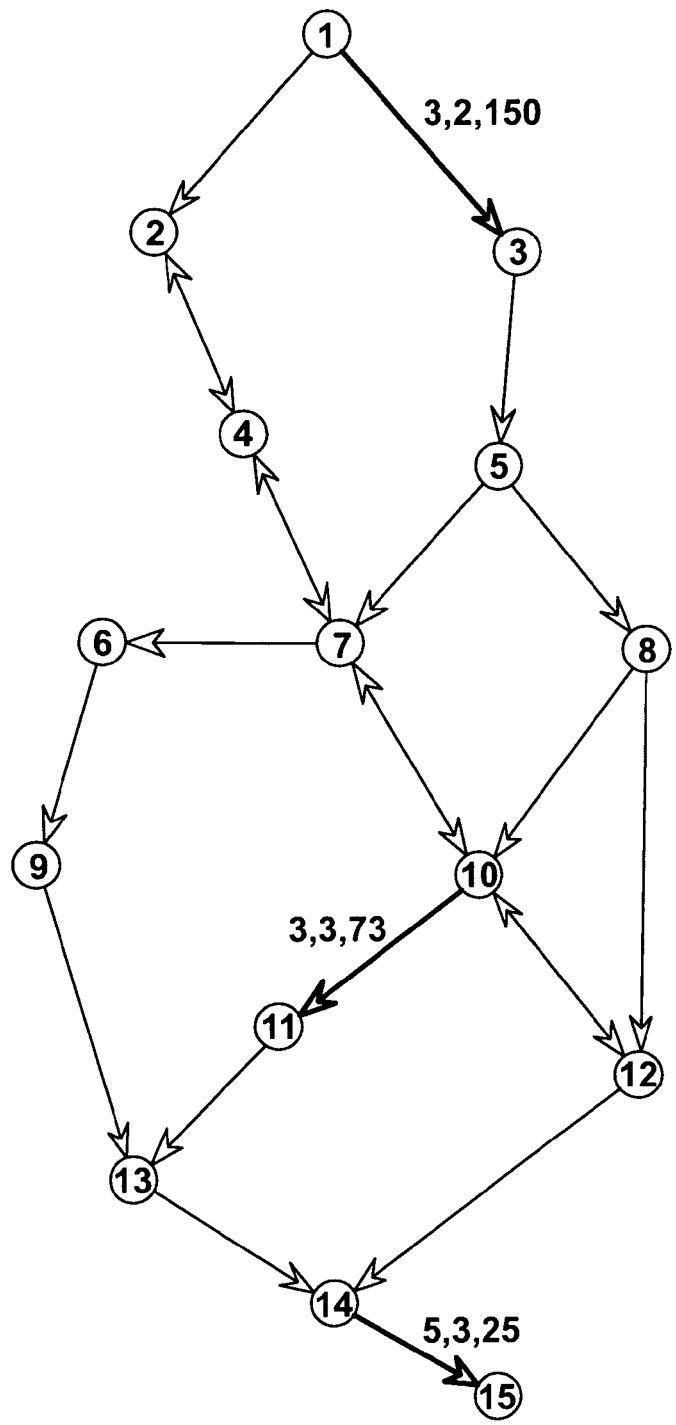
FIG. 12 illustrates the location reference points required to completely reference that location, and FIGS. 13-21 provide various schematic illustrations useful in the context of the logical data format, described below, and specifically.

As a next step, the location reference path will be composed of the two shortest-paths and the ordered list of location reference points will now be formed. FIG. 12 shows the lines in bold which are selected for the location reference points. The first location reference point points to the line from node (1) to (3) and indicates the start of the location reference path, the second location reference point points to the line from node (10) to (11) and this line was necessary to avoid the deviation from the location. The last location reference point points to the line from node (14) to (15) and indicates the end of the location reference path.

The penultimate step is a check of the validity of the location reference. Since all lengths between two subsequent location reference points are less than the maximum distance, the location reference is confirmed as being valid.

The final step is the conversion of the ordered list of LRPs into a Binary location reference, and the following description of both the Logical Data Format and Physical Data Format as prescribed by the applicant will assist in the understanding of how this is achieved. It is to be emphasised that the following description providing details of the specific formats is provided only as an example, and the skilled reader will appreciate that other formats are possible.

Specification for Logical Data Format & Physical Data Format

The following table explains common terms and abbreviations used in this document and in the context of location referencing:

TABLE A1

| Explanation of common abbreviations | |
|---|---|
| Abbreviation | Description |
| AF | Attribute Flag - a flag which indicates that the binary representation of the location reference includes attribute information |
| ArF | Area Flag - a flag which indicates that the location reference describes an area |

TABLE A1-continued

Explanation of common abbreviations

| Abbreviation | Description |
|---|---|
| BEAR | Bearing - angle between the direction to a point in the network and a reference direction (here: the true North) |
| COORD | Coordinates - a pair of two values (longitude and latitude) representing a position in a two-dimensional network |
| DNP | Distance to Next Point - the length in meter to the next location reference point (measured along the location reference path between these two LRP) |
| FOW | Form Of Way - Certain aspects of the physical form that a line takes. It is based on a number of certain physical and traffic properties. |
| FRC | Functional Road Class - A classification based on the importance of the role that the line performs in the connectivity of the total road network. |
| lat | Latitude - geographic coordinate used for north-south measurement |
| LFRCNP | Lowest Functional Road Class to Next Point |
| lon | Longitude - geographic coordinate used for east-west measurement |
| LRP | Location Reference Point - a point of the location which holds relevant information enabling a map-independent location reference; typically a collection of information describing an object in the map; consists of a coordinate and additional information about a line in the map. |
| NOFF | Negative Offset - distance in meter along the location reference path between the real end of the location and the end of the location reference path |
| NOffF | Negative Offset Flag - a flag which indicates that a negative offset is included in the location reference |
| POFF | Positive Offset - distance in meter along the location reference path between the start of the location reference path and the real start of the location |
| POffF | Positive Offset Flag - a flag which indicates that a negative offset is included in the location reference |
| RFU | Reserved for future use - a bit in a binary stream which does not have a use yet |
| VER | Version - Version information |

1. Data Format

A location reference is a description of a designated part of a digital map or a sequence of geographical positions. For this description we use the model of location reference points (LRPs, see 1.1.1).

A location reference for line locations contains at least two LRPs but there is no maximum number of LRPs defined. The location reference path is the path in the digital map described by the LRPs and can be found by a shortest-path calculation between each consecutive pair of LRPs.

1.1 Logical Data Format Specification

The logical data format describes the logical model for location references according to the MapLoc™ standard.

1.1.1. Location Reference Point (LRP)

The basis of a location reference is a sequence of location reference points (LRPs). Such a LRP contains a coordinate pair, specified in WGS84 longitude and latitude values and additionally several attributes.

The coordinate pair (see 1.1.3.1) represents a geographical position within a map/network and is mandatory for a LRP. The coordinate pair belongs to a "real" node within a network.

The attributes (see section 1.1.3.2 to 1.1.3.6) describe values of a line within a network at which the line is incident to the node described by the coordinate pair. In this context it is not defined if the attributes refer to an incoming or outgoing line regarding the node. This will be specified in section 1.2.

1.1.2. Topological Connection of LRPs

Figure 13:
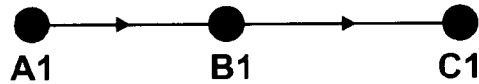
FIG. 13 shows the required consecutive connection of location reference points (LRPs)

Referring to FIG. 13, The location reference points shall be stored in a topological order or "next point"-relationship of successive LRPs. The last point in this order will have no next point in this relationship.

FIG. 13 shows an example of this relationship. The LRPs are indicated by A1, B1 and C1 and the black lines and arrows indicate the order of the points from A1 to C1 in the location reference path. In this example the LRP A1 will have B1 as next point, B1 will have C1 as next point and C1 will have no next point.

1.1.3. Components of LRPs

This section describes the components of a location reference point.

1.1.3.1 Coordinate Pair

Coordinate pair stands for a pair of WGS84 longitude (lon) and latitude (lat) values. This coordinate pair specifies a geometric point in a digital map. The lon and lat values are stored in a decamicrodegrees resolution ($10^{-5}$, or five decimal points).

| Abbreviation: COORD | Type: (float, float) |
|---|---|

1.1.3.2 Functional Road Class

The functional road class (FRC) is a road classification based on the importance of a road. The possible values of the FRC attribute are shown in Table A2. If there are more FRC values defined than these 8 location reference values then a proper mapping needs to be done or less important classes needs to be ignored.

TABLE A2

Logical format: Functional road class
FRC

FRC 0 - Main road
FRC 1 - First class road
FRC 2 - Second class road

TABLE A2-continued

Logical format: Functional road class
FRC

FRC 3 - Third class road
FRC 4 - Fourth class road
FRC 5 - Fifth class road
FRC 6 - Sixth class road
FRC 7 - Other class road

| Abbreviation: FRC | Type: integer |
|---|---|

1.1.3.3 Form of Way

The form of way (FOW) describes the physical road type. The possible values of the FOW attribute are shown in Table A3.

TABLE A3

Logical Format: Form of way

| FOW | Description |
|---|---|
| UNDEFINED | The physical road type is unknown. |
| MOTORWAY | A Motorway is defined as a road permitted for motorized vehicles only in combination with a prescribed minimum speed. It has two or more physically separated carriageways and no single level-crossings. |
| MULTIPLE_CARRIAGEWAY | A multiple carriageway is defined as a road with physically separated carriageways regardless of the number of lanes. If a road is also a motorway, it should be coded as such and not as a multiple carriageway. |
| SINGLE_CARRIAGEWAY | All roads without separate carriageways are considered as roads with a single carriageway. |
| ROUNDABOUT | A Roundabout is a road which forms a ring on which traffic travelling in only one direction is allowed. |
| TRAFFICSQUARE | A Traffic Square is an open area (partly) enclosed by roads which is used for non-traffic purposes and which is not a Roundabout. |
| SLIPROAD | A Slip Road is a road especially designed to enter or leave a line. |
| OTHER | The physical road type is known but does not fit into one of the other categories. |

| Abbreviation: FOW | Type: integer |
|---|---|

1.1.3.4 Bearing

The bearing (BEAR) describes the angle between the true North and a line which is defined by the coordinate of the LRP and a coordinate which is BEARDIST along the line defined by the LRP attributes. If the line length is less than BEARDIST then the opposite point of the line is used (regardless of BEARDIST). The bearing is measured in degrees and always positive (measuring clockwise from North). The parameter BEARDIST is defined in Table A4.

| Abbreviation: BEAR | Type: integer |
|---|---|

TABLE A4

Logical format: Parameter BEARDIST

| Abbreviation | Description | Value | Unit |
|---|---|---|---|
| BEARDIST | distance between two coordinates which form a line for the calculation of the bearing value | 20 | metres |

Figure 14:
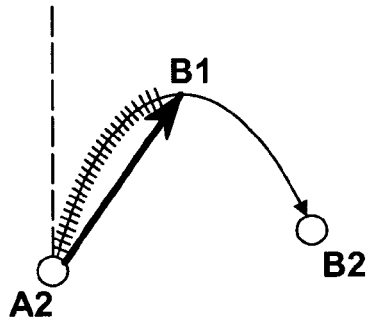
FIG. 14 illustrates how a bearing is calculated for one LRP.

FIG. 14 shows how the second point for the bearing calculation is determined. The figure shows a line from A2 to B2 which is longer than BEARDIST. The shaded part of this line is exactly BEARDIST meters long so that the point marked with B' is BEARDIST meters away from A2 traversing along the line from A2 to B2. The straight line from A2 to B' is now considered for the calculation of the bearing value. Note, this is different to the angle that would have been calculated if the opposite node of line (in this case, this would be B2) is used.

Figure 15:
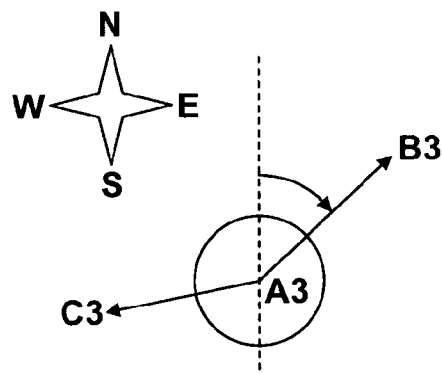
FIG. 15 shows how bearings can vary in a positive sense only, FIG. 16 demonstrates how a "distance to next point" attribute may be determined for a LRP, and further demonstrates which LRP that attribute relates to, FIG. 17 illustrates the use of offsets.

FIG. 15 shows two examples of the bearing value calculation. There are two lines, one from A3 to B3 and one from A3 to C3. For both lines the arcs indicate the angles to the North.

1.1.3.5 Distance to Next LRP

This DNP field describes the distance to the next LRP in the topological connection of the LRPs. The distance is measured in meters and is calculated along the location reference path. The last LRP will have the distance value 0.

| Abbreviation: DNP | Type: integer |
|---|---|

Figure 16:
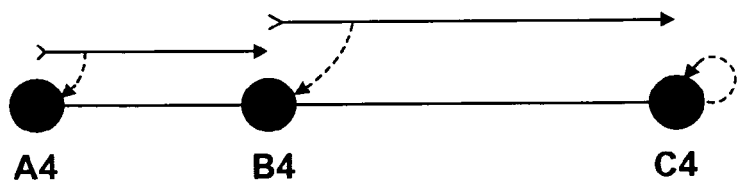

FIG. 16 shows an example of the distance calculation and assignment. The three LRPs are in a sequence from A4 over B4 to C4. Therefore the distance between A4 and B4 along the location reference path will be assigned to A4. The LRP B4 will hold the distance between B4 and C4 and the LRP C4 will have a distance value of 0.

1.1.3.6 Lowest FRC to Next LRP

The lowest FRC (LFRCNP) is the lowest FRC value which appears in the location reference path between two consecutive LRPs. The highest FRC value is 0 and the lowest possible FRC value is valued with 7.

| Abbreviation: LFRCNP | Type: integer |
|---|---|

1.1.4. Offsets

Offsets are used to shorten the location reference path at its start and end. The new positions along the location reference path indicate the real start and end of the location.

1.1.4.1 Positive Offset

Figure 17:
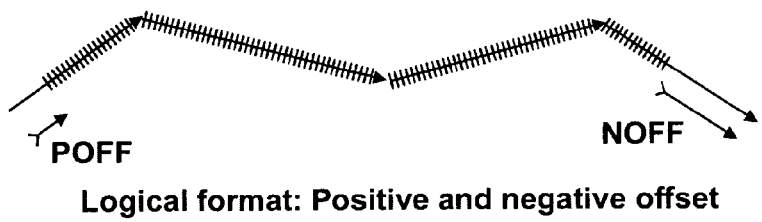

The positive offset (POFF) is the difference of the start point of the location reference and the start point of the desired location along the location reference path. The value is measured in meters. FIG. 17 shows an example for the calculation of the positive and negative offset. The lines are indicating the location reference path and the hatching indicates the desired location.

| Abbreviation: POFF | Type: integer |
|---|---|

1.1.4.2 Negative Offset

The negative offset (NOFF) is the difference of the end point of the desired location and the end point of the location reference along the location reference path. The value is measured in meters. (see FIG. 16 also).

| Abbreviation: NOFF | Type: integer |
|---|---|

1.2 Relationship Attributes—LRP

All attributes are linked to a LRP. For all LRPs (except that last LRP) the attributes describe an outgoing line of the node at the LRP coordinate. The attributes of the last LRP direct to an incoming of the node at the LRP coordinate.

Figure 18:
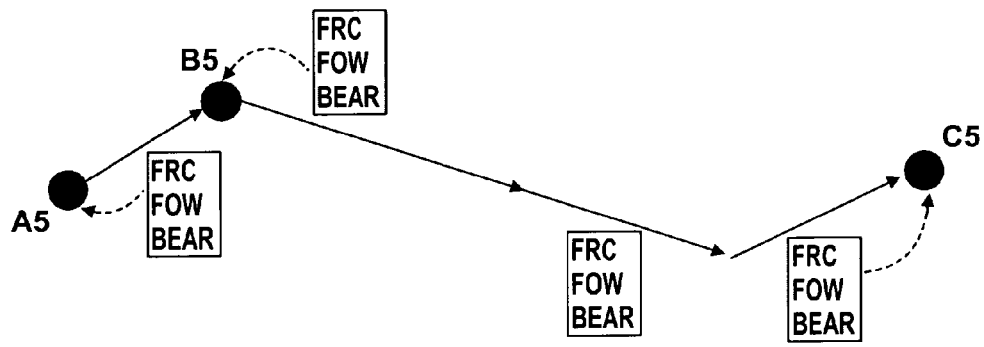
FIG. 18 shows the manner in which LRPs are provided with attributes, FIGS. 19/20 illustrates nodes to be avoided during the determination of a location reference.

FIG. 18 shows an example for the relationship between a LRP and the attributes. The lines indicate the location reference path and the nodes A5, B5 and C5 are the LRPs. Note that there is also a line whose start and end node is not a LRP (the third line in the sequence). This line does not need to be referenced because it is covered by the shortest path between the LRPs B5 and C5.

The LRPs A5 and B5 direct to an outgoing line and the last LRP C5 directs to an incoming line.

1.3 Data Format Rules

These rules describe additional regulations for location references according to this specification. These rules are used to simplify the encoding and decoding process and to increase the accuracy of the results.

Rule-1 The maximum distance between two location reference points shall not exceed 15 km. The distance is measured along the location reference path. If this condition is not fulfilled for a location reference then a sufficient number of additional LRPs shall be inserted.

The maximum distance between two consecutive location reference points is restricted in order to speed up shortest-path computation because several short routes can be computed quicker than one large route if the routing algorithm has to take the whole network into account. The restriction also provides the opportunity to from a compact binary format with an acceptable accuracy.

Rule-2 All lengths are integer values. If there are float values available then we will round these values to get an integer representation.

Different maps might store the length values in different formats and also with different precision and the uniform basis for all is the usage of integer values. It is also more compact to transmit integer values in a binary format than using float values.

Rule-3 Two LRPs are mandatory and the number of intermediate LRPs is not limited.

A line location reference must always have at least two location reference points indicating the start and the end of the location. If the encoder detects critical situations where the decoder (on a different map) might get into trouble, the location reference might be enhanced with additional intermediate LRPs.

Rule-4 The coordinates of the LRPs shall be chosen on real network nodes.

These real network nodes shall be junctions in the real world and it is expected that these junctions can be found in different maps with a higher probability than positions somewhere on a line. Additionally nodes shall be avoided which can be easily skipped during a route search. At these avoidable nodes it is not possible to deviate from a route.

Figure 19:
Figure 20:

Nodes having only one incoming and one outgoing line shall be avoided since these nodes are not related to junctions (see FIG. 19) and can be stepped over during route search. Nodes which have two incoming and two outgoing lines and there are only two adjacent nodes shall also be avoided (see FIG. 20).

If one of these nodes is selected for a LRP then this LRP should be shifted along the location reference path in order to find a suitable node. This can be done since a route calculation will step over such avoidable nodes without leaving the desired path.

If the start or the end of a location is placed on avoidable nodes then the encoder should expand the location uniquely and should find a suitable node outside of the location. This expansion must never go into the location because this will shorten the location.

1.3.1. Overview of the Data Format Rules

The following Table A5 summarizes the data format rules.

TABLE A5

| Data format rules overview ||| 
|---|---|---|
| Rule | Description | Value |
| Rule 1 | max distance between two consecutive LRPs | 15000 m |
| Rule 2 | road length values | treated as integer values |
| Rule 3 | number of LRPs | at least two LRPs |
| Rule 4 | avoidable nodes | LRPs shall be placed on real network nodes (also valid for start and end of a location) |

1.4 Binary Representation

The physical data format describes a byte-oriented stream format for the logical data format specified above. It uses the components described in the logical data format in section 1.1.

1.4.1. Data Types

The physical data format uses the following data types. Table A6 gives an overview of all available data types and specifies the name, the type and the designated size of each data type. In the following sections the data type names are used to indicate the size and type for each data component.

TABLE A6

Physical format: Data types

| Data type name | Type | Size | Range |
|---|---|---|---|
| Boolean | flag with true = 1, false = 0 | 1 bit | 0-1 |
| uByte | unsigned integer | 1 byte | 0-255 |
| uShort | unsigned integer | 2 bytes | 0-65535 |
| uSmallInt | unsigned integer | 3 bytes | 0-16777215 |
| uInteger | unsigned integer | 4 bytes | 0-4294967295 |
| sByte | signed integer | 1 byte | −128-127 |
| sShort | signed integer | 2 bytes | −32768-32767 |
| sSmallInt | signed integer | 3 bytes | −8388608-8388607 |
| sInteger | signed integer | 4 bytes | −2147483648-2147483647 |
| String[n] | array of n characters | n bytes | variable size |
| BitField[n] | array of n bits | n bits | variable size |

Negative integer values are stored in the two's complement format.

1.4.2. Coordinates (COORD)

Each point in a map consists of a coordinate pair "longitude" (lon) and "latitude" (lat) represented in WGS84 coordinates. The directions north and east are represented by positive values (longitude and latitude respectively). The lon and lat values are stored in a decamicrodegrees resolution ($10^{-5}$, five decimals).

The coordinate values will be transmitted as integer values. These values will be generated using Equation E1 which calculates a 24-bit integer representation. The resolution parameter is set to 24. This translation leads to an error of about 2.4 meter at most. The backward translation is described in Equation E2. Both equations make use of the signum function which is −1 for negative values, 1 for positive values and 0 otherwise.

Transformation from decimal coordinates into integer values $$\text{int} = \left( \text{sgn}(deg) * 0.5 + \frac{deg * 2^{Resolution}}{360°} \right) \quad \text{Equation E1}$$

Transformation from integer values into decimal coordinates $$deg = \left( \frac{(\text{int} - \text{sgn}(\text{int}) * 0.5) * 360°}{2^{Resolution}} \right) \quad \text{Equation E2}$$

The physical format makes use of an absolute and a relative coordinate format. The absolute format represents the designated values of the geographical position and the relative value is the offset the coordinates relative to the preceding coordinate.

1.4.2.1 Absolute Format

The absolute format describes geographical position in a 24-bit resolution. Table A7 shows the data type used for the absolute format.

TABLE A7

Physical format: Coordinate format (absolute)

| Data type | Value | Description |
|---|---|---|
| sSmallInt | −8388608-+8388607 | 24 bit representation |

1.4.2.2 Relative Format

The relative format is used to describe differences between two consecutive coordinates. The difference is calculated for each value (lon/lat) separately as shown in Equation E3. The current and previous values represent the latitude (longitude) value in degrees. The difference between these two values is multiplied with 100000 in order to resolve an integer value.

$$relative = round(100000 * (currentPoint - previousPoint))$$

Equation E3: Relative coordinates calculation

Table A8 shows the maximum distances which are possible using a 16-bit representation. The figures are calculated for a fixed coordinate at lon=5° and lat=52° (location in the Netherlands).

TABLE A8

Physical format: Longitude/Latitude ranges for relative coordinates

| | latitude | | longitude | |
|---|---|---|---|---|
| byte | lower bound | upper bound | lower bound | upper bound |
| 2 | −36459 m | 36460 m | −22504 m | 22504 m |

Table A9 shows the data type for 2 bytes offsets.

TABLE A9

Physical format: Coordinate format (relative)

| Data type | Value | Description |
|---|---|---|
| sShort | −32768-+32767 | 2 bytes relative coordinates |

1.4.3. Attribute Values

The binary format of the attributes will follow in this section.

1.4.3.1 Functional Road Class (FRC)

The functional road class (FRC) can hold eight different values as described in the logical format. These eight values are represented by 3 bits and the mapping is shown in Table A10.

TABLE A10

Physical format: Functional road class

| Data type | Value (integer) | Value (binary) | Description |
|---|---|---|---|
| BitField[3] | 0 | 000 | FRC 0 - Main road |
| | 1 | 001 | FRC 1 - First class road |
| | 2 | 010 | FRC 2 - Second class road |
| | 3 | 011 | FRC 3 - Third class road |
| | 4 | 100 | FRC 4 - Fourth class road |
| | 5 | 101 | FRC 5 - Fifth class road |
| | 6 | 110 | FRC 6 - Sixth class road |
| | 7 | 111 | FRC 7 - Other class road |

1.4.3.2 Form of Way (FOW)

The form of way (FOW) can hold eight different values as described in the logical format. These eight values are represented by 3 bits and the mapping is shown in Table A11.

TABLE A11

Physical format: Form of way

| Data type | Value (integer) | Value (binary) | Description |
|---|---|---|---|
| BitField[3] | 0 | 000 | UNDEFINED |
| | 1 | 001 | MOTORWAY |
| | 2 | 010 | MULTIPLE_CARRIAGEWAY |
| | 3 | 011 | SINGLE_CARRIAGEWAY |
| | 4 | 100 | ROUNDABOUT |
| | 5 | 101 | TRAFFICSQUARE |
| | 6 | 110 | SLIPROAD |
| | 7 | 111 | OTHER |

1.4.3.3 Bearing (BEAR)

The bearing describes the angle between the road and the true North as described in the logical format. The physical data format defines 32 sectors whereby each sector covers 11.25° of the circle. These 32 sectors are represented by 5 bits. Table A12 shows the data type for the bearing attribute and Table A13 shows the mapping from the sectors to the concrete value.

TABLE A12

Physical format: Bearing

| Data type | Value | Description |
|---|---|---|
| BitField[5] | 0-31 | number of the sector in which the angle between the North and the line specified in the logical data format is located; the full circle is divided into 32 sectors each covering an angle of 11.25°. |

TABLE A13

Physical format: Bearing value definition

| Value | Sector |
|---|---|
| 0 | 000.00° <= x < 011.25° |
| 1 | 011.25° <= x < 022.50° |
| 2 | 022.50° <= x < 033.75° |
| 3 | 033.75° <= x < 045.00° |
| 4 | 045.00° <= x < 056.25° |
| 5 | 056.25° <= x < 067.50° |
| 6 | 067.50° <= x < 078.75° |
| 7 | 078.75° <= x < 090.00° |
| 8 | 090.00° <= x < 101.25° |
| 9 | 101.25° <= x < 112.50° |
| 10 | 112.50° <= x < 123.75° |
| 11 | 123.75° <= x < 135.00° |
| 12 | 135.00° <= x < 146.25° |
| 13 | 146.25° <= x < 157.50° |
| 14 | 157.50° <= x < 168.75° |
| 15 | 168.75° <= x < 180.00° |
| 16 | 180.00° <= x < 191.25° |
| 17 | 191.25° <= x < 202.50° |
| 18 | 202.50° <= x < 213.75° |
| 19 | 213.75° <= x < 225.00° |
| 20 | 225.00° <= x < 236.25° |
| 21 | 236.25° <= x < 247.50° |
| 22 | 247.50° <= x < 258.75° |
| 23 | 258.75° <= x < 270.00° |
| 24 | 270.00° <= x < 281.25° |
| 25 | 281.25° <= x < 292.50° |
| 26 | 292.50° <= x < 303.75° |
| 27 | 303.75° <= x < 315.00° |
| 28 | 315.00° <= x < 326.25° |
| 29 | 326.25° <= x < 337.50° |
| 30 | 337.50° <= x < 348.75° |
| 31 | 348.75° <= x < 360.00° |

Figure 21:
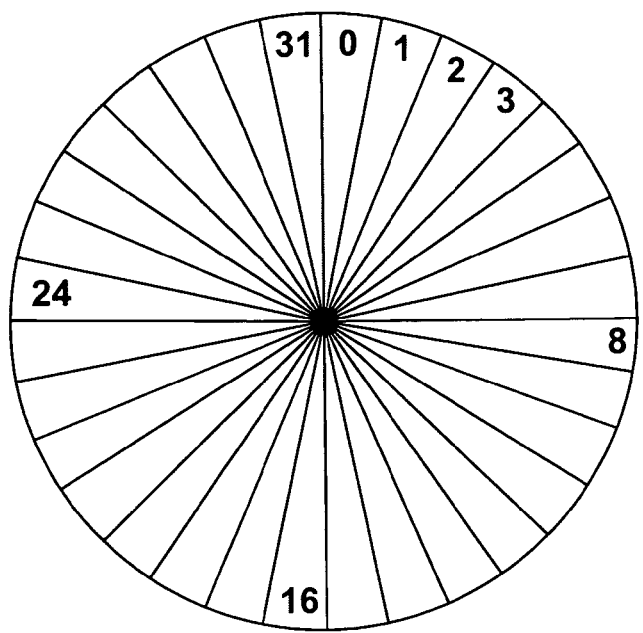
FIG. 21 illustrates how bearing values for a LRP fall within 1 of 32 discrete sectors of a circle.

Equation E4 outlines the calculation of the bearing value and FIG. 21 provides a graphical overview of the sectors.

Calculation of the bearing value $$\text{value} = \left\lfloor \frac{\text{angle}}{11.25°} \right\rfloor, \quad 0° \leq \text{angle} < 360° \quad \text{Equation E4}$$

1.4.3.4 Distance to Next LRP (DNP)

The DNP attribute measures the distance between two consecutive LRPs along the location reference path as described in the logical format.

The physical data format defines an 8-bit representation and Table A14 shows the data type used for DNP. This representation defines 255 intervals and in combination with rule 1 of the data format rules (maximum length between two consecutive LRPs is limited by 15000 m) each interval will have a length of 58.6 meters.

TABLE A14

Physical format: Distance to next point

| Data type | Value | Description |
|---|---|---|
| BitField[5] | 0-255 | distance interval according to Equation E5 |

Equation E5 shows how the DNP values can be calculated.

Calculation of the DNP value $$\text{value} = \left\lfloor \frac{\text{length}}{58.6 \text{ m}} \right\rfloor \quad \text{Equation E5}$$

1.4.3.5 Lowest FRC to Next Point (LFRCNP)

The lowest FRC to the next point indicates the lowest functional road class used in the location reference path to the next LRP. This information could be used to limit the number of road classes which need to be scanned during the decoding. See Table A15 for a definition of the data type.

TABLE A15

Physical format: Lowest FRC to next point

| Data type | Value | Description |
|---|---|---|
| BitField[3] | 0-7 | holds the same values as described in Table A10 |

1.4.4. Location Reference Header

The Location Reference header contains general information about the reference.

1.4.4.1 Version (VER)

The version is used to distinguish between several physical and data formats for location references. The version number is represented by 3 bits and the data type is shown in Table A16.

TABLE A16

Physical format: Version

| Data type | Value | Description |
|---|---|---|
| BitField[3] | 0-7 | current version number |

1.4.4.2 Attribute Flag (AF)

The attribute flag indicates whether there are attributes appended to each LRP or not. The AF value is 0 if no attributes are appended and therefore the location reference only consists of coordinates. Otherwise a value of 1 indicates that attributes are appended to each LRP. The data type for the AF is shown in Tables A17 and A18.

TABLE A17

Physical format: Attribute flag

| Data type | Value | Description |
|---|---|---|
| Boolean | 0, 1 | flag, indicating whether attributes are appended to each LRP or not |

TABLE A18

Physical format: Attribute flag values

| Value | Description |
|---|---|
| 0 | no attributes are appended |
| 1 | for each LRP a set of attributes is appended |

1.4.4.3 Area Flag (ArF)

The area flag indicates whether the location reference describes an area or not. If this flag is set then the location shall be connected and we describe an area, as seen in Tables A19 and A20 below.

TABLE A19

Physical format: Area flag

| Data type | Value | Description |
|---|---|---|
| Boolean | 0, 1 | flag, indicating whether the location reference describes an area or not |

TABLE A20

Physical format: Area flag values

| Value | Description |
|---|---|
| 0 | location reference describes no area |
| 1 | location reference describes an area |

1.4.5. Offsets

Offsets are used to locate the start and end of a location more precise than bound to the nodes in a network. The logical format defines two offsets, one at the start of the location and one at the end of the location and both offsets operate along the lines of the location and are measured in meters. The offset values are not mandatory and a missing offset value means an offset of 0 meters. Offsets are also only valid for line locations which have attributes included.

1.4.5.1 Offset Flags

Offset flags indicate whether the data includes a specific offset information or not. The physical data format deals with two flags corresponding to the two different offset values. The positive offset flag (PoffF) and the negative offset flag (NoffF) are described in Tables A21 and A22.

TABLE A21

Physical format: Offset flag

| Data type | Value | Description |
|---|---|---|
| Boolean | 0, 1 | flag, indicating whether the corresponding offset value is included in the data or not |

TABLE A22

Physical format: Offset flag values

| Value | Description |
|---|---|
| 0 | location reference data does NOT include the corresponding offset information |
| 1 | location reference data includes the corresponding offset information |

1.4.5.2 Offset Values

The offset values (positive and negative, POFF and NOFF) indicate the distance between the start (end) of the location reference path and the "real" start (end) of the location.

The physical data format defines an 8-bit representation for each offset value. Table A23 shows the data type used for POFF and NOFF. This representation allows us to define 256 intervals with a length of each interval of 58.6 meters. The interval number calculation for offsets is outlined in Equation E6.

TABLE A23

Physical format: Offset

| Data type | Value | Description |
|---|---|---|
| BitField[5] | 0-255 | offset length interval according to Equation E6 |

Calculation of offset values $$\text{value} = \left\lfloor \frac{\text{offset length}}{58.6 \text{ m}} \right\rfloor \qquad \text{Equation E6}$$

1.5 Physical Data Format Specification

This section describes the arrangement of the data fields in a byte stream. It is assumed that we have a byte-oriented stream and we can use 8 bits per byte.

1.5.1. Overview

The main structure of the binary format is:

Header, First LRP, following LRPs, Last LRP, and offsets

The Header, the first LRP and the last LRP are mandatory and the number of following LRPs is not limited. The Last LRP has its own structure due to a different information level. Offsets are optional and the existence will be indicated by flags in the attributes of the last LRP.

Table A24 gives an overview of the main structure. The stream can be read from the left to the right, so that the first received byte will be the status byte. For each coordinate the first received value will be the longitude value followed by the latitude value.

The calculation of message sizes depending on the number of LRPs can be found in section 1.6 below.

TABLE A24

| Structure | Header | First LRP | | | | | following LRP | | | | | ... |
|---|---|---|---|---|---|---|---|---|---|---|---|---|
| Name | Status | absolute Longitude | absolute Latitude | attr. 1 | attr. 2 | attr. 3 | relative Longitude | relative Latitude | attr. 1 | attr. 2 | attr. 3 | ... |
| # bytes | 1 | 3 | 3 | 1 | 1 | 1 | 2 | 2 | 1 | 1 | 1 | ... |
| description | section 1.5.2 | Section 1.5.3 | section 1.5.3 | section 1.5.5.1 | section 1.5.5.2 | section 1.5.5.3 | section 1.5.4 | section 1.5.4 | section 1.5.5.1 | section 1.5.5.2 | section 1.5.5.3 | ... |

| Structure | ... | last LRP | | | | positive offset | negative offset |
|---|---|---|---|---|---|---|---|
| Name | ... | relative Longitude | relative Latitude | attr. 1 | attr. 4 | offset | offset |
| # bytes | ... | 2 | 2 | 1 | 1 | 1 | 1 |
| description | ... | section 1.5.3 | section 1.5.3 | section 1.5.5.1 | section 1.5.5.4 | section 1.5.6 | section 1.5.6 |

1.5.2. Status Byte

The status byte is transmitted once for every location reference and contains the area flag (ArF, section 1.4.4.3), attribute flag (AF, section 1.4.4.2) and the version information (VER, section 1.4.4.1). The bits 7, 6 and 5 are reserved for future use (RFU) and shall be 0. Table A25 gives an overview of the usage of each bit in the status byte.

TABLE A25

| | | | Status byte | | | | | |
|---|---|---|---|---|---|---|---|---|
| | | | Bit | | | | | |
| | 7 | 6 | 5 | 4 | 3 | 2 | 1 | 0 |
| used for | RFU | RFU | RFU | Arf | AF | VER | | |

In this particular version of the format, attributes are added to each LRP and areas are not described. If the "current version" is 2, the status byte will have the value shown in Table A26:

TABLE A26

| | Status byte value | | | | | | | |
|---|---|---|---|---|---|---|---|---|
| | Bit | | | | | | | |
| | 7 | 6 | 5 | 4 | 3 | 2 | 1 | 0 |
| value | 0 | 0 | 0 | 0 | 1 | 010 | | |

1.5.3. First LRP Coordinates

The coordinates of the first LRP are transmitted in an absolute format (see section 1.4.2.1) and therefore each value (lon and lat) will use 3 bytes. Table A27 shows the byte order for longitude and latitude values.

TABLE A27

| | First LRP coordinates | | |
|---|---|---|---|
| | Bit | | |
| | 23 22 21 20 19 18 17 16 | 15 14 13 12 11 10 9 8 | 7 6 5 4 3 2 1 0 |
| used for | highest byte | middle byte | lowest byte |

1.5.4. Following LRP Coordinates

The coordinates of the following LRPs and the last LRP are transmitted in a relative format (see section 1.4.2.2) and therefore each value (lon and lat) will use 2 bytes. Table A28 shows the byte order for longitude and latitude values.

TABLE A28

| | Following LRPs coordinates | |
|---|---|---|
| | Bit | |
| | 15 14 13 12 11 10 9 8 | 7 6 5 4 3 2 1 0 |
| used for | highest byte | lowest byte |

1.5.5. Attributes

Attributes are added to each LRP. There are 4 different types of attributes depending on the position of a LRP in the location reference.

1.5.5.1 First Attribute Byte (Attr. 1)

The first attribute byte contains the attributes FRC (see section 1.4.3.1) and FOW (see section 1.4.3.2) and two bits are reserved for future use. Table A29 shows the usage of each bit.

TABLE A29

First attribute byte - valid for all LRPs

| | | | Bit | | | | |
|---|---|---|---|---|---|---|---|
| 7 | 6 | 5 | 4 | 3 | 2 | 1 | 0 |
| used for | RFU | RFU | FRC | | | FOW | |

1.5.5.2 Second Attribute Byte (Attr. 2)

The second attribute byte contains the attributes LFRCNP (see section 1.4.3.5) and BEAR (see section 1.4.3.3). Table A30 shows the usage of each bit. This attribute is not valid for the last LRP since there is no LFRCNP information available.

TABLE A30

Second attribute byte - valid for all LRPs, except the last LRP

| | | | Bit | | | | |
|---|---|---|---|---|---|---|---|
| 7 | 6 | 5 | 4 | 3 | 2 | 1 | 0 |
| used for | LFRCNP | | | BEAR | | | |

1.5.5.3 Third Attributes Byte (Attr. 3)

The third attribute byte contains the attribute DNP (see section 1.4.3.4) as shown in Table A31. This attribute is not valid for the last LRP since there is no DNP information available.

TABLE A31

Third attribute byte - valid for all LRPs, except the last LRP

| | | | Bit | | | | |
|---|---|---|---|---|---|---|---|
| 7 | 6 | 5 | 4 | 3 | 2 | 1 | 0 |
| used for | | DNP | | | | | |

1.5.5.4 Fourth Attribute Byte (Attr. 4)

The attribute 4 contains the BEAR information, the positive and negative offset flags (see section 1.4.5.1) and one bit is reserved for future use. This attribute is used for the last LRP, as shown in Table A32.

TABLE A32

Fourth attribute bytes - valid only for the last LRP

| | | | Bit | | | | |
|---|---|---|---|---|---|---|---|
| 7 | 6 | 5 | 4 | 3 | 2 | 1 | 0 |
| used for | RFU | POffF | NOffF | BEAR | | | |

1.5.6. Offset

The positive offset (POFF) and negative offset (NOFF) are only included if the corresponding flags in attribute 4 indicate their existence. Absent offset values indicate an offset of 0 meters. The offset values are calculated according to section 1.4.5., and bit usage for these offsets is shown in Tables A33, A34.

TABLE A33

Positive offset value

| | | | Bit | | | | |
|---|---|---|---|---|---|---|---|
| 7 | 6 | 5 | 4 | 3 | 2 | 1 | 0 |
| used for | POFF | | | | | | |

TABLE A34

Negative offset value

| | | | Bit | | | | |
|---|---|---|---|---|---|---|---|
| 7 | 6 | 5 | 4 | 3 | 2 | 1 | 0 |
| used for | NOFF | | | | | | |

1.6 Message Size Calculation

The message size of a location reference depends on the number of LRPs included in the location reference. There must be at least two LRPs in the location reference. Also mandatory is the header with the status information. The following calculation and Table A35 show message sizes depending on the number of LRPs.

Header
        1 byte status
        Total: 1 byte
    First LRP
        6 bytes COORD (3 bytes each for lon/lat)
        3 bytes Attributes
        Total: 9 bytes
    Following LRPs
        4 bytes COORD (2 bytes each for lon/lat)
        3 bytes Attributes
        Total: 7 bytes
    Last LRP
        4 bytes COORD (2 bytes each for lon/lat)
        2 bytes Attributes
        Total: 6 bytes
    Offset (if included)
        1 byte positive offset (if included)
        1 byte negative offset (if included)
        Total: 0-2 bytes

TABLE A35

Message sizes depending on the number of LRPs

| # LRPs | Message size |
|---|---|
| 2 | 16 bytes |
| | (+1 or +2 bytes offset, if included) |
| 3 | 23 bytes |
| | (+1 or +2 bytes offset, if included) |
| 4 | 30 bytes |
| | (+1 or +2 bytes offset, if included) |

TABLE A35-continued

Message sizes depending on the number of LRPs

| # LRPs | Message size |
|---|---|
| 5 | 37 bytes |
|   | (+1 or +2 bytes offset, if included) |
| 6 | 44 bytes |
|   | (+1 or +2 bytes offset, if included) |
| 7 | 51 bytes |
|   | (+1 or +2 bytes offset, if included) |
| 8 | 58 bytes |
|   | (+1 or +2 bytes offset, if included) |
| ... | ... |
| n (n > 1) | 1 + 9 + (n − 2)*7 + 6 bytes |
|   | (+1 or +2 bytes offset, if included) |

A specific example of the manner in which the above formats are used is now provided with reference to the location reference described above with reference to FIGS. 9, 10, 11 and 12 in which three location reference points (nodes ①, ⑩ and ⑮ and lines ①-③, ⑩-⑪ and ⑭-⑮) are identified as precisely describing a location.

The location reference consists of three location reference points and Table A36 below shows the coordinates for the nodes ①, ⑩ and ⑮. These nodes are the corresponding nodes to the location reference points. In preparation of the binary format this table also shows the relative coordinates. The node ① corresponds to the location reference point 1 and will have coordinates in absolute format. Node ⑩ corresponding to location reference point 2 will have relative coordinates to the location reference point 1. Node ⑮ corresponding to location reference point 2 will also have relative coordinates but now referencing to location reference point 2.

TABLE A36

Example coordinates

| Node ID | LRP index | Longitude | Latitude | Relative longitude | Relative latitude |
|---|---|---|---|---|---|
| ① | 1 | 6.12683° | 49.60851° | — | — |
| ⑩ | 2 | 6.12838° | 49.60398° | 155 | −453 |
| ⑮ | 3 | 6.12817° | 49.60305° | −21 | −93 |

The relative longitude and latitude are calculated according Equation E3 above. The offsets being calculated in step 2 of the encoding process are shown in Table A37. In the binary data only the positive offset will appear because the negative offset is 0 and a missing offset will be treated as 0.

TABLE A37

Example offset values

| Field | Value |
|---|---|
| positive Offset | 150 |
| negative Offset | 0 |

Table A38 below collects the relevant data for each location reference point from the underlying digital map, and through calculation. This includes the functional road class, the form of way and the bearing of the corresponding line. The needed information about the path between two subsequent location reference points is also shown (lowest functional road class and distance to the next location reference point).

TABLE A38

Location reference points determined during encoding

| LRP index | FRC | FOW | BEAR | LFRCNP | DNP |
|---|---|---|---|---|---|
| 1 | FRC3 | MULTIPLE_CARRIAGEWAY | 135° | FRC3 | 561 |
| 2 | FRC3 | SINGLE_CARRIAGEWAY | 227° | FRC5 | 274 |
| 3 | FRC5 | SINGLE_CARRIAGEWAY | 290° | — | — |

The BEAR, LFRCNP and DNP attributes are determined as described above:

The following tables above hold all relevant information for creating the binary data. The following tables outline the binary data according to the Physical Data Format:

| | |
|---|---|
| Status byte: | see Table A39 |
| LRP 1: | see Table A40 to Table A44 |
| LRP 2 | see Table A45 to Table A49 |
| LRP 3 | see Table A50 to Table A53 |
| Offset | see Table A54 |

TABLE A39

Binary example: status byte

| | Bit | | | | | | | |
|---|---|---|---|---|---|---|---|---|
| | 7 | 6 | 5 | 4 | 3 | 2 | 1 | 0 |
| Description | RFU | RFU | RFU | ArF | AF | Version | | |
| Value | 0 | 0 | 0 | 0 | 1 | 0 | 1 | 0 |

TABLE A40

Binary example: LRP1 - absolute longitude

| | Byte | | | | | | | | | | | | | | | | | | | | | | |
|---|---|---|---|---|---|---|---|---|---|---|---|---|---|---|---|---|---|---|---|---|---|---|---|
| | First | | | | | | | | Second | | | | | | | | Third | | | | | | |
| Bit | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| Value | 0 | 0 | 0 | 0 | 0 | 1 | 0 | 0 | 0 | 1 | 0 | 1 | 1 | 0 | 1 | 1 | 0 | 1 | 0 | 1 | 1 | 0 | 1 | 1 |

TABLE A41

Binary example: LRP1 - absolute latitude

| | Byte | | | | | | | | | | | | | | | | | | | | | | |
|---|---|---|---|---|---|---|---|---|---|---|---|---|---|---|---|---|---|---|---|---|---|---|---|
| | First | | | | | | | | Second | | | | | | | | Third | | | | | | |
| Bit | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| Value | 0 | 0 | 1 | 0 | 0 | 0 | 1 | 1 | 0 | 1 | 0 | 0 | 0 | 1 | 1 | 0 | 1 | 1 | 1 | 1 | 0 | 1 | 0 | 0 |

TABLE A42

Binary example: LRP1 - attribute 1

| | Bit | | | | | | | |
|---|---|---|---|---|---|---|---|---|
| | 7 | 6 | 5 | 4 | 3 | 2 | 1 | 0 |
| Description | RFU | RFU | FRC | | | FOW | | |
| Value | 0 | 0 | 0 | 1 | 1 | 0 | 1 | 0 |

TABLE A43

Binary example: LRP1 - attribute 2

| | Bit | | | | | | | |
|---|---|---|---|---|---|---|---|---|
| | 7 | 6 | 5 | 4 | 3 | 2 | 1 | 0 |
| Description | LFRCNP | | | Bearing | | | | |
| Value | 0 | 1 | 1 | 0 | 1 | 1 | 0 | 0 |

TABLE A44

Binary example: LRP1 - attribute 3

| | Bit | | | | | | | |
|---|---|---|---|---|---|---|---|---|
| | 7 | 6 | 5 | 4 | 3 | 2 | 1 | 0 |
| Description | | | | DNP | | | | |
| Value | 0 | 0 | 0 | 0 | 1 | 0 | 0 | 1 |

TABLE A45

Binary example: LRP2 - relative longitude

| | Byte | | | | | | | | | | | | | | |
|---|---|---|---|---|---|---|---|---|---|---|---|---|---|---|---|
| | First | | | | | | | | Second | | | | | | |
| Bit | 7 | 6 | 5 | 4 | 3 | 2 | 1 | 0 | 7 | 6 | 5 | 4 | 3 | 2 | 1 | 0 |
| Value | 0 | 0 | 0 | 0 | 0 | 0 | 0 | 0 | 1 | 0 | 0 | 1 | 1 | 0 | 1 | 1 |

TABLE A46

Binary example: LRP2 - relative latitude

| | Byte | | | | | | | | | | | | | | |
|---|---|---|---|---|---|---|---|---|---|---|---|---|---|---|---|
| | First | | | | | | | | Second | | | | | | |
| Bit | 7 | 6 | 5 | 4 | 3 | 2 | 1 | 0 | 7 | 6 | 5 | 4 | 3 | 2 | 1 | 0 |
| Value | 1 | 1 | 1 | 1 | 1 | 1 | 1 | 0 | 0 | 1 | 1 | 1 | 0 | 1 | 1 |

TABLE A47

Binary example: LRP2 - attribute 1

| | Bit | | | | | | | |
|---|---|---|---|---|---|---|---|---|
| | 7 | 6 | 5 | 4 | 3 | 2 | 1 | 0 |
| Description | RFU | RFU | FRC | | | FOW | | |
| Value | 0 | 0 | 0 | 1 | 1 | 0 | 1 | 1 |

TABLE A48

Binary example: LRP2 - attribute 2

| | Bit | | | | | | | |
|---|---|---|---|---|---|---|---|---|
| | 7 | 6 | 5 | 4 | 3 | 2 | 1 | 0 |
| Description | LFRCNP | | | Bearing | | | | |
| Value | 1 | 0 | 1 | 1 | 0 | 1 | 0 | 0 |

TABLE A49

Binary example: LRP2 - attribute 3

| | Bit | | | | | | | |
|---|---|---|---|---|---|---|---|---|
| | 7 | 6 | 5 | 4 | 3 | 2 | 1 | 0 |
| Description | DNP | | | | | | | |
| Value | 0 | 0 | 0 | 0 | 0 | 1 | 0 | 0 |

TABLE A50

Binary example: LRP3 - relative longitude

| | Byte | | | | | | | | | | | | | | |
|---|---|---|---|---|---|---|---|---|---|---|---|---|---|---|---|
| | First | | | | | | | | Second | | | | | | |
| Bit | 7 | 6 | 5 | 4 | 3 | 2 | 1 | 0 | 7 | 6 | 5 | 4 | 3 | 2 | 1 | 0 |
| Value | 1 | 1 | 1 | 1 | 1 | 1 | 1 | 1 | 1 | 1 | 0 | 1 | 0 | 1 | 1 |

TABLE A51

Binary example: LRP3 - relative latitude

| | Byte | | | | | | | | | | | | | | |
|---|---|---|---|---|---|---|---|---|---|---|---|---|---|---|---|
| | First | | | | | | | | Second | | | | | | |
| Bit | 7 | 6 | 5 | 4 | 3 | 2 | 1 | 0 | 7 | 6 | 5 | 4 | 3 | 2 | 1 | 0 |
| Value | 1 | 1 | 1 | 1 | 1 | 1 | 1 | 0 | 1 | 0 | 0 | 0 | 1 | 1 |

TABLE A52

Binary example: LRP3 - attribute 1

| Bit | | | | | | | |
|---|---|---|---|---|---|---|---|
| 7 | 6 | 5 | 4 | 3 | 2 | 1 | 0 |
| RFU | RFU | FRC | | | FOW | | |
| 0 | 0 | 1 | 0 | 1 | 0 | 1 | 1 |

Description / Value shown in first column.

TABLE A53

Binary example: LRP3 - attribute 4

| Bit | | | | | | | |
|---|---|---|---|---|---|---|---|
| 7 | 6 | 5 | 4 | 3 | 2 | 1 | 0 |
| RFU | PoffF | NoffF | Bearing | | | | |
| 0 | 1 | 0 | 1 | 1 | 0 | 0 | 1 |

TABLE A54

Binary example: positive Offset

| Bit | | | | | | | |
|---|---|---|---|---|---|---|---|
| 7 | 6 | 5 | 4 | 3 | 2 | 1 | 0 |
| | | | POFF | | | | |
| 0 | 0 | 0 | 0 | 0 | 0 | 1 | 0 |

The full binary data stream will have a length of 24 bytes and consists of the following (ordered as bytes from left to right and top to down):

```
00001010  00000100  01011011  01011011  00100011  01000110
11110100  00011010  01101100  00001001  00000000  10011011
11111110  00111011  00011011  10110100  00000100  11111111
11101011  11111111  10100011  00101011  01011001  00000010
```

The invention claimed is:

1. A method of encoding a continuous path within a road network, said path being completely represented within a digital map and expressible as a path list of at least one of lines and segments existing in said digital map and consecutively ordered, said method comprising:
   (i) storing a start position in a route search list, said start position being one of:
   the line or segment first appearing in said path list or, where the start node of said first line or segment in said path list is artificial, the first line or segment appearing in said digital map having a real start node and which leads directly to said first line or segment optionally through other artificial nodes,
   a most recently identified deviation line or segment also appearing in said path list,
   (ii) determining a path from the start node of the start position and including said start position to an end node of the last line or segment in the path list within said digital map, said path being determined according to an algorithm,
   (iii) comparing the shortest path so determined to the path list for identity, and in the absence of identity, identifying at least one deviation line or segment being part of the path list and having a start node representative of an intersection in said digital map but not being the line or segment first appearing in said path list, and if such deviation line or segment does not terminate at the end node of the last line or segment appearing in the path list, repeating step (i) using said deviation line or segment, and
   (iv) storing the last line or segment in the path list in said route search list if not already stored.

2. A method according to claim 1 wherein the algorithm used in determination of the path is a shortest path algorithm.

3. A method according to claim 1 wherein in step (iii), if the deviation line or segment terminates at the end node of the last line or segment appearing in the path list, and the predecessor of the last line or segment in the shortest path does not coincide with the penultimate line or segment appearing in said path list, then a second deviation line or segment is exceptionally identified being that line or segment emanating from the last node appearing in the path list which coincides with an intersection.

4. A method according to claim 1, further comprising converting the resulting route search list into a machine-readable format represented in binary or a markup language such as XML.

5. A method according to claim 1 including at least one of: concatenation, conversion, transposition, and validity checking, which result in a valid, ordered list of location reference points, or a machine-readable representation thereof.

6. A method according to claim 1, wherein the method includes a preliminary step of analysing each item in the path list representing said continuous path for validity, and in the event that the path list is not valid in a relevant respect, raising an exception.

7. A method according to claim 5 wherein the validity check includes a check to establish whether either or both of the start node of the first mentioned line or segment in the path list and the end node of the last mentioned in said path list coincide with a real node in the digital map and in the absence of such coincidence, the preliminary validity check includes identifying suitable real nodes and extending the continuous path accordingly by including additional lines or segments in the path list, and storing an offset representative of the distance between the real nodes and artificial nodes.

8. A method according to claim 1 further comprising imposing a restriction on the maximum distance between successive location reference points.

9. A method according to claim 8 wherein the maximum distance so imposed is 15km.

10. A method according to claim 1 further comprising, in the encoder, determining whether a turn restriction check option is enabled, and if so enabled, assessing the location desired to be encoded for turn restrictions identified in the digital map and which may prejudice or compromise said location or make it impossible to navigate, and if such are identified, returning an error.

11. A computer program element, embodied on a non-transitory computer readable medium, comprising computer program code to execute, when run on a computer device, the method as set forth in claim 1.

12. A system for encoding a continuous path location comprising:
   an encoder, wherein the encoder stores a start position in a route search list, said start position being one of: the line or segment first appearing in said path list or, where the start node of said first line or segment in said path list is artificial, the first line or segment appearing in said digital map having a real start node and which leads directly to said first line or segment optionally through other artificial nodes and a most recently identified deviation line or segment also appearing in said path list, and wherein the encoder determines a path from the start node of the start position and including said start position to an end node of the last line or segment in the path list within said digital map, said path being determined according to an algorithm, compares the shortest path so determined to the path list for identity, and in the absence of identity, identifying at least one deviation line or segment being part of the path list and having a start node representative of an intersection in said digital map but not being the line or segment first appearing in said path list, and if such deviation line or segment does not terminate at the end node of the last line or segment appearing in the path list, repeats using said deviation line or segment, and stores the last line or segment in the path list in said route search list if not already stored, and a database for storing pre-encoded locations and the results of previous attempts at encoding those locations, wherein the system, on receiving a location to be encoded, first queries the database to establish whether that location or a part of it, forms a part of or is identical to a location having been previously stored within said database, said system returning either the previously encoded location or a part of it in the case of encoding having already been effected, or alternatively passing the continuous path location to the encoder, the output of which is in any event stored in said database together with that continuous path location.

* * * * *